United States Patent
Shigekusa et al.

(10) Patent No.: US 6,332,574 B1
(45) Date of Patent: Dec. 25, 2001

(54) METHOD OF READING BAR CODE

(75) Inventors: Hisashi Shigekusa, Okazaki; Masami Tanaka, Handa; Tadao Oshima, Nagoya, all of (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/438,847

(22) Filed: Nov. 12, 1999

(30) Foreign Application Priority Data

Nov. 16, 1998 (JP) .................................................. 10-325278
Sep. 24, 1999 (JP) .................................................. 11-270926

(51) Int. Cl.$^7$ ...................................................... G06K 5/04
(52) U.S. Cl. ................................ 235/462.12; 235/462.09; 235/462.16
(58) Field of Search ..................... 235/462.01, 462.08, 235/462.09, 462.11, 462.12, 462.15, 462.41, 462.16, 462.19

(56) References Cited

U.S. PATENT DOCUMENTS

| | | | |
|---|---|---|---|
| 4,717,818 | * 1/1988 | Broockman et al. | 235/462.12 |
| 5,128,527 | * 7/1992 | Kawai et al. | 235/462.12 |
| 5,241,164 | * 8/1993 | Pavlidis et al. | 235/462.12 |
| 5,304,787 | * 4/1994 | Wang | 235/470 |
| 5,457,308 | * 10/1995 | Spitz et al. | 235/462.12 |
| 5,550,365 | * 8/1996 | Klancnik et al. | 235/462.12 |
| 5,739,518 | * 4/1998 | Wang | 235/454 |
| 5,764,798 | 6/1998 | Liu | 382/190 |
| 5,854,479 | * 12/1998 | Watanabe et al. | 235/462.12 |
| 5,917,172 | * 6/1999 | Watanabe et al. | 235/462.12 |
| 5,942,740 | * 8/1999 | Watanabe et al. | 235/462.07 |

FOREIGN PATENT DOCUMENTS

| | | |
|---|---|---|
| 6-150042 | * 5/1994 | (JP) . |
| 6-150043 | * 5/1994 | (JP) . |
| 6-150044 | * 5/1994 | (JP) . |
| 7-93451 | 4/1995 | (JP) . |
| 8-210854 | * 8/1996 | (JP) . |
| 10-198754 | 7/1998 | (JP) . |

* cited by examiner

Primary Examiner—Michael G. Lee
Assistant Examiner—Diane I. Lee
(74) Attorney, Agent, or Firm—Pillsbury Winthrop

(57) ABSTRACT

A method of reading a bar code having guard bars at both sides thereof without fail even if the bar code image is highly distorted. An image region taken in by a CCD camera is scanned in horizontal and/or vertical directions to find out a first guard bar in the bar code. Then, a first scanning line for reading the bar code is set in a direction perpendicular to the first guard bar. The bar code is scanned along the first scanning line. If the first scanning line goes out of the bar code region, the first scanning line is traced back to a bar which is last read. Another scanning line starting from the last read bar and extending perpendicularly thereto is set to read the rest of the bar code. This process is repeated until the second guard bar is detected and a whole bar code is completely read. The first scanning line may be set, so that it only reads a predetermined number of bars and the rest of the bar code is read by new scanning lines starting from the last read bar. Alternatively, the bar code region is searched by preliminarily scanning the image region divided into plural rectangular sections. The bar code region is determined based on the number of brightness changes in each divided section. The first guard bar in the bar code can be easily found in this manner.

21 Claims, 22 Drawing Sheets

USUAL BAR CODE

HIGH BAR CODE

LOW BAR CODE

IDEAL POSITION

READABLE POSITION

UNREADABLE POSITION

FIG. 24A
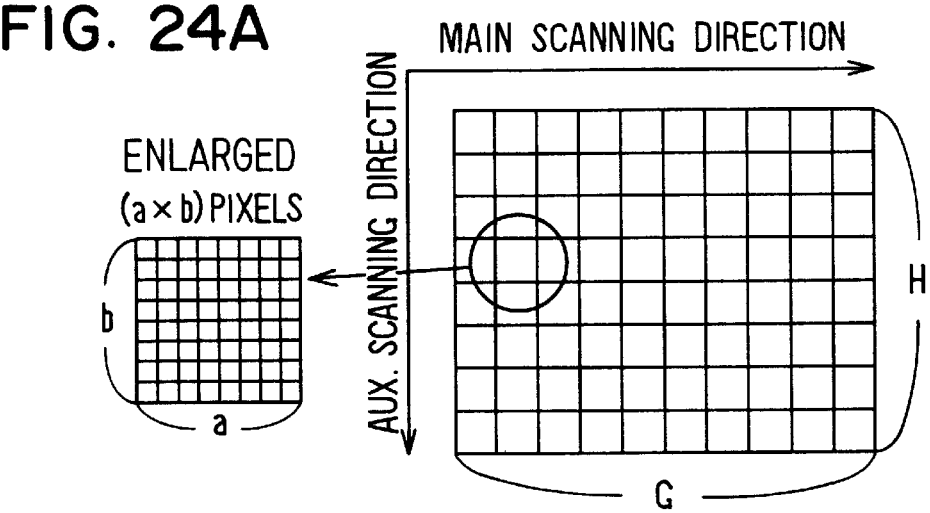
FIG. 24B
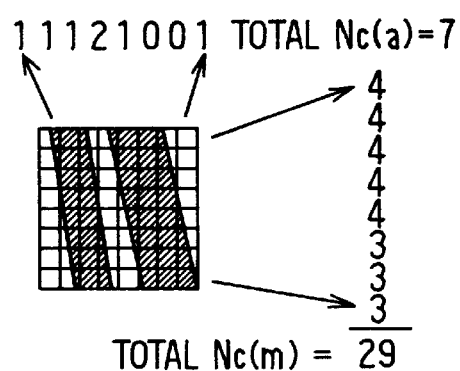
FIG. 24C
| 1 | 2 | 1 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 5 | 10 | 15 | 6 | 0 |
| 0 | 0 | 13 | 22 | 27 | 30 | 29 | 32 | 16 | 0 |
| 0 | 0 | 16 | 31 | 30 | 29 | 30 | 32 | 16 | 0 |
| 0 | 0 | 12 | 30 | 30 | 29 | 26 | 16 | 10 | 0 |
| 0 | 0 | 4 | 11 | 7 | 3 | 0 | 0 | 0 | 0 |
| 0 | 0 | 0 | 0 | 0 | 0 | 0 | 0 | 0 | 0 |
Nc(m) IN DETECTING SECTIONS

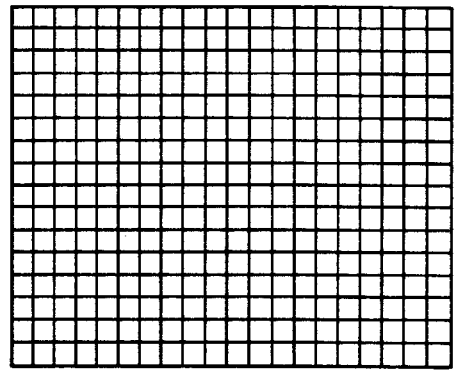
FIG. 30A  SMALLER DETECTING SECTIONS
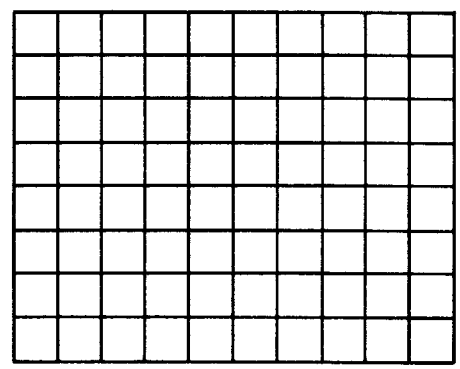
FIG. 30B  NORMAL DETECTING SECTIONS
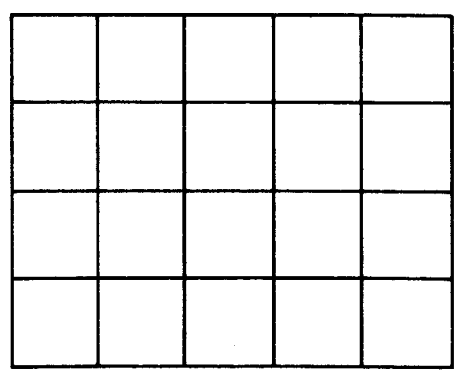
FIG. 30C  LARGER DETECTING SECTIONS

METHOD OF READING BAR CODE

CROSS-REFERENCE TO RELATED APPLICATIONS

This application is based upon and claims benefit of priority of Japanese Patent Applications No. Hei-10-325278 filed on Nov. 16, 1998 and No. Hei-11-270926 filed on Sep. 24, 1999, the contents of which are incorporated herein by reference.

BACKGROUND OF THE INVENTION

1. Field of the Invention

The present invention relates to a method of reading a bar code attached to a variety of articles, and more specifically to a method of correctly reading a bar code, even if the image of a bar code taken in by a bar code reader is distorted.

2. Description of Related Art

A variety of bar codes are widely used these days. Some examples are shown in FIGS. 16A–16C. A bar code shown in FIG. 16A is a usual type, the one shown in FIG. 16B has a large height H, and the one shown in FIG. 16C has a short profile. Those bar codes have to be correctly read irrespective of their size and shape. If a bar code is scanned as shown in FIG. 17A, it can be correctly read because all the bars are scanned by a scanning line. If the scanning line is somewhat slanted as shown in FIG. 17B, the bar code is still readable. However, the bar code is unreadable if the scanning line goes therethrough as shown in FIG. 17C, because some bars cannot be scanned.

Some counter measures to overcome the unreadable problem have been made, for example, in JP-A-7-93451 and JP-A-10-198754. JP-A-10-198754 proposes to provide main detecting lines and auxiliary detecting lines that are perpendicular to the main detecting lines, so that the auxiliary detecting lines can pass through the bar code if the main detecting lines cannot. In this case, however, there is still a situation where the bar code cannot be read. That is, if none of the main and auxiliary detecting lines passes through the bar code due to too much rotation or distortion of the bar code region relative to the image region, the bar code cannot be read. JP-A-7-93451 proposes to set the scanning line in the direction perpendicular to a bar located at one side of the bar code as shown in FIGS. 18B and 18C. It is ideal if an image region taken into the bar code reader and a bar code region are square to each other as shown in FIG. 18A. In most cases, however, the bar code region rotates relative to the image region as shown in FIGS. 18B and 18C. Since the bar code reader proposed by JP-A-7-93451 calculates the inclination of the first bar and sets the scanning line in the perpendicular direction thereto as shown in FIGS. 18B and 18C, the scanning line passes through the bar code even if the bar code region is extremely rotated relative to the image region.

However, there are still other situations where the bar code reader proposed by JP-A-7-93451 cannot read the bar code. The bar code reader is not always positioned in parallel to a bar code plane. Some examples are shown in FIGS. 19A–19C and 19A'–19D'. If the bar code reader is positioned in parallel to the bar code plane as shown in FIG. 19A, the bar code region is not distorted even if it rotates relative to the image region as shown in FIG. 19A'. If the bar code reader is positioned not in parallel to the bar code plane as shown in FIG. 19B, the bar code region is distorted as shown in FIG. 19B'. If the bar code reader is positioned as shown in FIG. 19C, the bar code region is distorted as shown in FIG. 19C'. Further, if the bar code reader takes a slanted position both in the longitudinal and lateral directions (a combination of FIGS. 19B and 19C, the bar code region is extremely distorted as shown in FIG. 19D'. As exemplified above, the bar code region may be variously distorted according to the position of the bar code reader relative to the bar code plane. If the degree of distortion is not extremely large as shown in FIGS. 19B' and 19C', the bar code reader proposed by JP-A-7-93451 may be able to read it by setting the scanning line perpendicularly to the first bar. However, in the case the bar code region is extremely distorted as shown in FIG. 19D', the bar code cannot be read because the scanning line does not pass through all the bars in the bar code. It is most desirable for the bar code reader to be able to read the bar code, regardless of any rotation or distortion of the bar code region relative to the image region.

SUMMARY OF THE INVENTION

The present invention has been made in view of the above-mentioned problem, and an object of the present invention is to provide a method of reading a bar code, in which the bar code is readable even if the bar code image taken into the reader is highly distorted.

A certain area in which a bar code region is included is taken in by a CCD camera as an image region into a bar code reader. In the bar code region, a bar code itself to be read by the bar code reader and a first guard bar located at one side of the bar code and a second guard bar located at the other side of the bar code are included. To find out the bar code region in the image region, detecting lines running in both horizontal and vertical directions are set. The image region is scanned along the detecting lines to search the first guard bar. When the first guard bar is found, a scanning line for reading the bar code is set in the direction perpendicular to the first guard bar. The bar code region is scanned along the scanning line. If the scanning line goes out of the bar code region without reaching the second guard bar, the scanning line is traced back to a bar which is last read by the scanning line. Then, a new scanning line to read the rest of the bar code is set so that it starts from the last read bar and extends perpendicularly thereto. This process are repeated until the second guard bar is found and the bar code is completely read.

Alternatively, the bar code region is scanned along the first set scanning line by a predetermined number of bars or a predetermined distance. Then, a new scanning line is set so that it starts from the last read bar and extends in the direction perpendicular thereto. This process is repeated until the second guard bar is found and a whole bar code is read. The predetermined number of the bars to be scanned by a scanning line may be set at one.

The first scanning line may be set to start from a cross-point of the detecting line and the first guard bar, and the a new scanning line may start from a cross-point of the last read bar and a previous scanning line. It is also possible to shift the starting point of the scanning line toward the center of the bar code region to complete scanning with a smaller number of the scanning lines, in case such a cross-point is located close to the ends portion of the guard bar or the bar in the code bar. The first scanning line may start from the center of the first guard bar, and the following new scanning line may start from the center of the last read bar. In this manner, the number of scanning lines required to read a whole bar code may be saved.

Plural detecting lines may be set, and the horizontal detecting lines may be first used for detecting the first guard bar. After the horizontal detecting lines are all used, then the vertical detecting lines may be used. When plural detecting lines are set, it is preferable to first use the detecting lines closer to the center line of the bar code region and then to sequentially use detecting lines remote from the center line, so that the number of the scanning lines necessary to find the first guard bar can be smaller. This is because it is highly probable that the bar code region is located closer to the center line. For the same purpose, the detecting lines may be set denser around the center line than in portions remote from the center line.

The bar code region in the image region may be searched by preliminarily scanning the image region before setting the detecting lines. In this case, the image region is divided into plural rectangular sections, and the number of brightness changes resulting from existence of the bar code in each divided section is counted. The divided sections having a similar number of brightness changes are highly presumed as representing the bar code region in the image region. In this manner, the bar code region is easily searched. It is preferable to calculate a ratio of the number of brightness changes along the vertical preliminary scanning direction to the number of brightness changes along the horizontal preliminary scanning direction, and to determine the bar code region by selecting divided sections having the ratio similar to one another. Also, a bar inclination in the bar code can be calculated based on the ratio of the number of brightness changes.

After the bar code region is searched and the bar inclination is calculated, a detecting line is set in the bar code region. In this manner the first guard bar is easily found. Preferably, a first detecting line is set so that it extends in the direction perpendicular to the bar inclination and passes a vicinity of the center of the bar code region. In this case, the first detecting line is also used as a scanning line for reading the bar code. If the first detecting line fails to find the second guard bar, other detecting lines which are parallel to the first detecting line or which are not parallel but pass the center of bar code region are set to find the second guard bar.

According to the present invention, the bar code is read by the bar code reader without fail, even if the bar code region taken in by the CCD camera is highly distorted. Further, the bar code region is efficiently searched and found out in the image region.

Other objects and features of the present invention will become more readily apparent from a better understanding of the preferred embodiments described below with reference to the following drawings.

BRIEF DESCRIPTION OF THE DRAWINGS

FIG. 19A' shows a position of a bar code region in an image region, the bar code image being taken in by the bar code reader positioned as shown in FIG. 19A;

FIG. 19B' shows a shape of a bar code region, the bar code image being taken in by the bar code reader positioned as shown in FIG. 19B;

FIG. 19C' shows a shape of a bar code region, the bar code image being taken in by the bar code reader positioned as shown in FIG. 19C.

FIG. 24A is a schematic chart showing detecting sections in an image region and pixels in each detecting section;

FIG. 24B is a schematic chart showing the number of brightness changes in a detecting section;

FIG. 24C is a schematic chart showing the number of brightness changes in all the detecting sections obtained by the main scanning;

FIGS. 30A, 30B and 30C are schematic chart showing detecting sections in an image region, the sections being differently divided.

Figure 1:
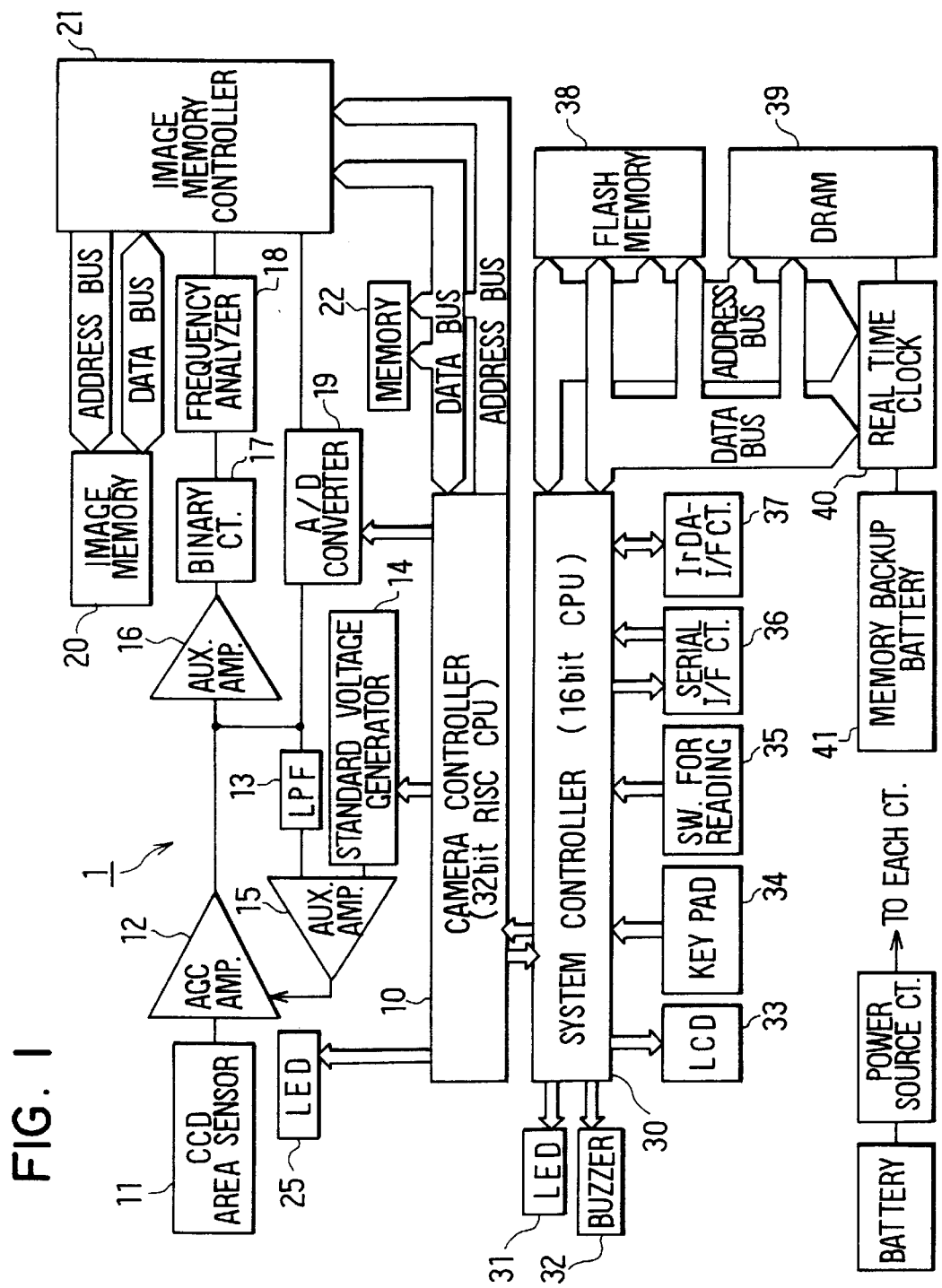
FIG. 1 is a block diagram showing a bar code reader.

DETAILED DESCRIPTION OF THE PREFERRED EMBODIMENTS (First Embodiment)

A first embodiment of the present invention will be described with reference to FIGS. 1–8. First, referring to FIG. 1, a bar code reader 1 will be briefly described. The bar code reader 1 includes a camera controller 10 and a system controller 30, both performing respective functions in the bar code reader 1. The following components or parts are connected to the camera controller 10: a CCD (Charge Coupled Device) area sensor 11, an ACG (Automatic Gain Control) amplifier 12, a LPF (Low Pass Filter) 13, a standard voltage generator 14, a negative feedback amplifier 15, an auxiliary amplifier 16, a binary circuit 17, a frequency analyzer 18, an A/D (Analog/Digital) converter 19, an image memory 20, an image memory controller 21, a memory 22, and an illuminating LED (Light Emitting Diode) 25.

The CCD area sensor 11 including a number of CCD elements arranged in a matrix photographs an image located within a two-dimensional image area. The two dimensional image area is scanned by the CCD area sensor 11, and signals representing the scanned image are fed to the AGC amplifier 12. The AGC amplifier 12 amplifies the signals, and the amplified signals are fed to the auxiliary amplifier 16 and the A/D converter 19. The AGC amplifier 12 amplifies the input signals with an amplification factor that corresponds to a gain control voltage fed from the negative feedback amplifier 15. An average voltage Vav that is obtained by integrating the output signals from the ACG amplifier 12 in the LPF 13 and a standard voltage Vst supplied from the standard voltage generator 14 are fed into the negative feedback amplifier 15. The gain control voltage to be fed to the ACG amplifier 12 is obtained by multiplying a voltage difference $\Delta V$ between Vav and Vst by a predetermined gain of the negative feedback amplifier 15.

The auxiliary amplifier 16 amplifies the signals fed from the AGC amplifier 12 and outputs the amplified signals to the binary circuit 17. The binary circuit 17 converts the input signals into binary signals based on a predetermined threshold and outputs the binary signals to the frequency analyzer 18. The frequency analyzer 18 detects a predetermined frequency component from the binary signals, and the results of the detection are fed to the memory controller 21.

On the other and, the A/D converter 19 converts the analog signals received from the AGC amplifier 12 into digital signals and outputs the digital signals to the image memory controller 21.

The image memory controller 21 is connected to the image memory 20, the camera controller 10 and the memory 22 through an address bus and a data bus. The camera controller 10 is constituted by a 32 bit RISC-CPU and controls the standard voltage generator 14, the A/D converter 19 and the illuminating LED 25. The level of the standard voltage Vst is controlled by the camera controller 10, and the bar code to be read is illuminated by red light from the illuminating LED 25 under the control of the camera controller 10. The camera controller 10 communicates with the system controller 30.

The following components or parts are connected to the system controller 30: an LED 31, a buzzer 32, an LCD (Liquid Crystal Display) 33, a key pad 34, a switch for reading 35, a serial I/F circuit 36, an IrDA (Infrared Data Association)-I/F circuit 37, a flash memory 38, a DRAM 39, a real time clock 40, and a memory backup battery 41.

The LED 31 is lit when image data to be read are properly decoded and is turned off when a predetermined period lapses thereafter. The buzzer 32 is also activated when the image data are properly decoded. The bar code read by the reader and other associated information are displayed on the LCD 33. The LCD 33 is designed to display images with two-stage luminance in this particular embodiment. The key pad 34 includes various keys such as ten keys and other function keys which are used for inputting information. The switch for reading 35 is operated to initiate reading operation of the bar code reader 1. The IrDA-I/F circuit 37 communicates with an outside device (not shown) under the IrDA protocol. It may transmit data to the outside device through light emitting elements (not shown) and may receive data (for example, a program for system operation or a command for awaiting data receipt) from the outside device via light receiving elements (not shown).

The system controller 30, the flash memory 38, the DRAM 39 and the real time clock 40 are connected to one other through the address bus and data bus. The system controller 30 constituted by a 16 bit CPU receives information from the key pad 34 and from the switch for reading 35. It controls the LED 31 and the buzzer 32, and also controls communication to be performed through the serial I/F circuit 36 and the IrDA-I/F circuit 37. Also, the system controller 30 displays the bar code image that is fed from the camera controller 10 on the LCD 33.

Figure 2A:
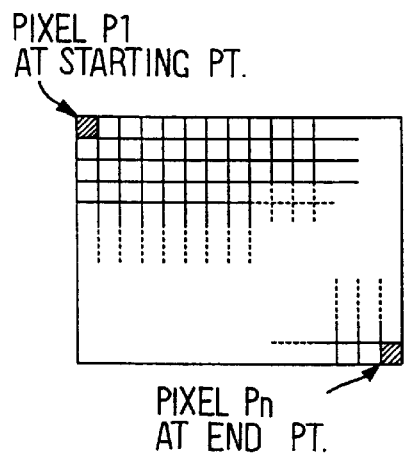
FIG. 2A is a schematic chart showing positions of pixels of a bar code image.
Figure 2B:
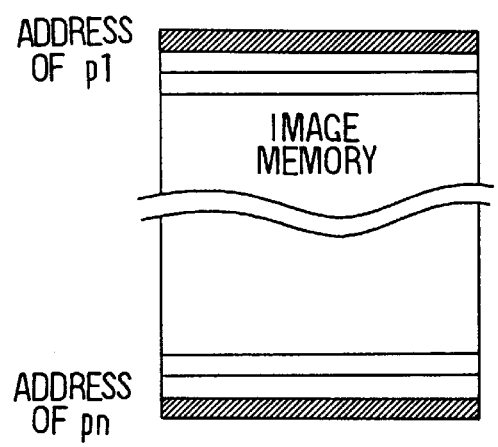
FIG. 2B is a schematic chart showing pixel addresses in a image memory.

The bar code reader 1 structured as described above operates in the following manner. The scanned signals fed from the CCD area sensor 11 are amplified by the AGC amplifier 12. The amplified scanned signals are converted into digital data by the A/D converter 19. The digital data corresponding to one frame are temporarily stored in the image memory 20. More specifically, as shown in FIG. 2A, the image region is sequentially scanned from a starting point at the upper left corner to an end point at the lower right corner to generate signals corresponding to respective pixels P1, P2 . . . Pn. The respective signals are stored, after they are converted into digital data, in respective addresses (p1), (p2) . . . (pn) in the image memory 20 as illustrated in FIG. 2B. The bar code is read and recognized based on the temporarily stored digital data.

Figure 3A:
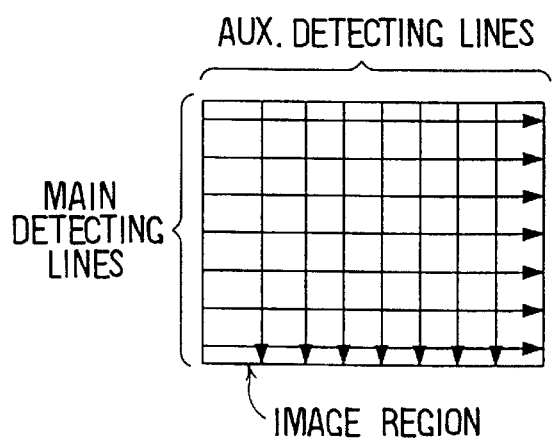
FIG. 3A is a chart illustrating main and auxiliary detecting lines in an image region.
Figure 3B:
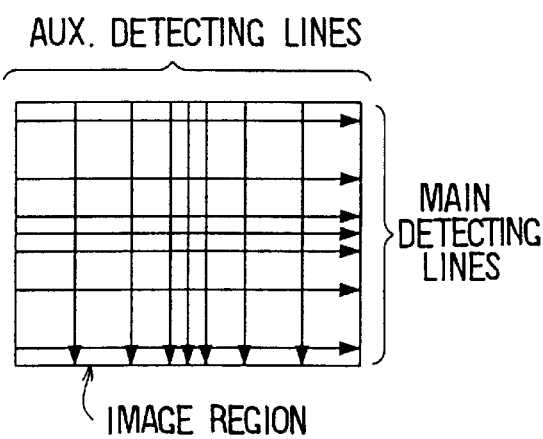
FIG. 3B is a chart illustrating another arrangement of main and auxiliary detecting lines in the image region.
Figure 4:
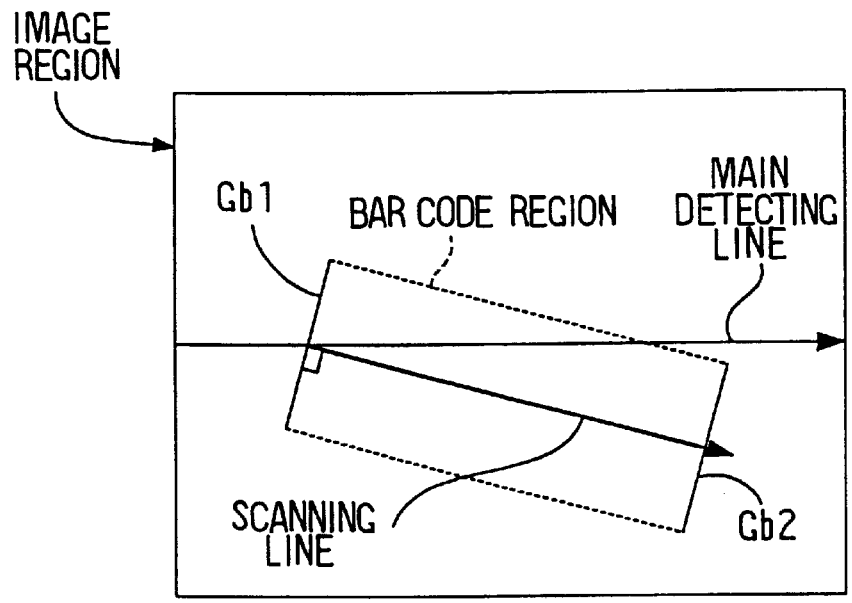
FIG. 4 is a chart showing a method for setting a scanning line that is perpendicular to a first guard bar in a bar code.
Figure 5:
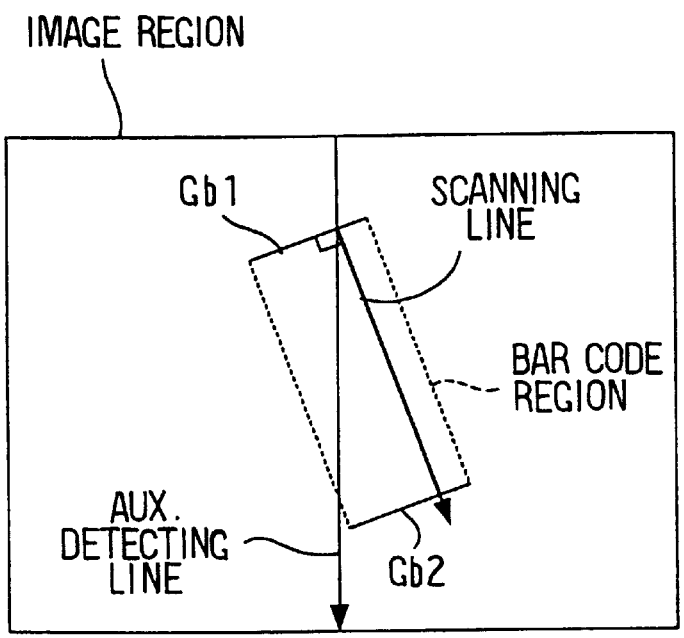
FIG. 5 is a chart showing another method for setting a scanning line, using an auxiliary detecting line.

The process of reading the bar code will be described in detail, referring to FIGS. 3A–8. First, as shown in FIGS. 3A and 3B, plural main detecting lines running horizontally from left to right on the two-dimensional image region and plural auxiliary detecting lines running vertically from top to bottom are set. Though the intervals between the detecting lines may be all equal as shown in FIG. 3A, it is preferable to make their intervals smaller at the vicinity of the horizontal and vertical center lines in the image region as shown in FIG. 3B. As shown in FIGS. 4 and 5, the bar code to be read is scanned along the main detecting line (FIG. 4) or along the auxiliary detecting line (FIG. 5) to find out the first guard bar Gb1. The first guard bar Gb1 that is parallel to bar code bars is located at the left side of the bar code region and the second guard bar Gb2 that is also parallel to bar code bars is located at the right side of the bar code region.

Then, a scanning line is set, so that it starts from the cross-point of the first guard bar Gb1 and the main detecting line (or the auxiliary detecting line) and runs perpendicularly to the first guard bar Gb1, as shown in FIGS. 4 and 5. To detect the first guard bar Gb1, the main detecting line is first used, and if all the main detecting lines cannot detect the first guard bar Gb1, then the auxiliary detecting lines are used.

Figure 6:
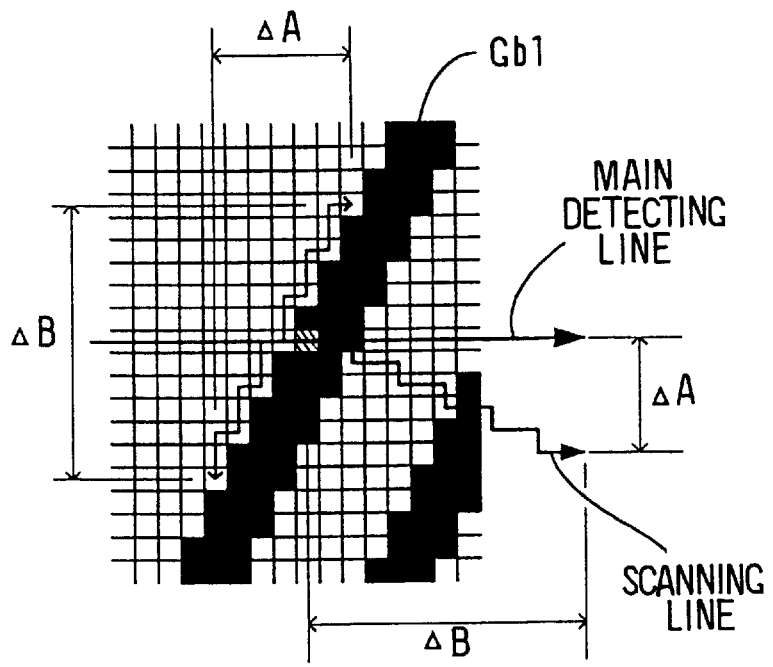
FIG. 6 is a chart showing a process for finding the first guard bar in the bar code.

The process of detecting the first guard bar Gb1 and setting the scanning line is illustrated in FIG. 6. When the main detecting line encounters and crosses a candidate guard bar, the vicinity of the cross-point is further searched, and it is determined that the candidate guard bar is a real one if it is a straight line. That is, the vicinity of the cross-point is searched along the candidate guard bar by a predetermined distance both in the horizontal and vertical directions. A horizontal deviation $\Delta A$ and a vertical deviation $\Delta B$ are detected at predetermined number of points.

If the inclination $\Delta B/\Delta A$ is substantially equal to one another at all the detecting points, it is determined that the candidate guard line is a straight line and it is a real one. If not, it is determined that the candidate guard line is not a real one.

Figure 7:
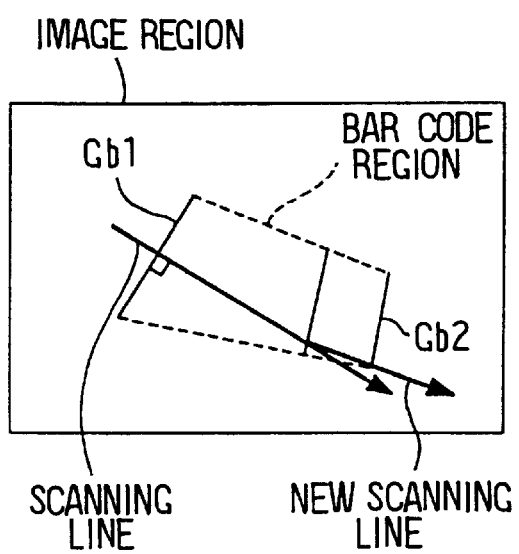
FIG. 7 is a chart illustrating a method of setting a new scanning line after an original scanning line goes out of a bar code region, as a first embodiment of the present invention.

Upon detection of the first guard bar Gb1, the scanning line is set, so that the scanning line starts from the cross-point of the first guard bar Gb1 and the main detecting line and extends perpendicularly to the first guard bar Gb1. The inclination of the scanning line to be set is $\Delta A/\Delta B$ because the inclination of the guard bar Gb1 is $\Delta B/\Delta A$. Thus, the inclination of the scanning line is readily determined without performing troublesome calculation. If the bar code region is not distorted (rectangular-shaped), the scanning line thus set passes through all the bars in the bar code without fail and reaches the second guard bar Gb2 located at the other side of the bar code, as shown in FIGS. 4 and 5. However, if the bar code region is distorted as shown in FIG. 7, the scanning line goes out of the bar code region and does not reach the second guard bar Gb2.

In the situation shown in FIG. 7, a new scanning line is set in place of the original scanning line in the following manner. The original scanning line is traced backward from a point where the original scanning line goes out of the bar code region to a point where a bar in the bar code is last detected correctly by the original scanning line. Then, a new scanning line is set, so that it starts from the cross-point of the last detected bar and the original scanning line, and extends perpendicularly to the last detected bar, as shown in FIG. 7. If the newly set scanning line reaches the second guard bar Gb2, then all the bar code area is successfully scanned and the bar code can be read. If the newly set scanning line goes out of the bar code region again and does not reach the second guard bar Gb2, then another new scanning line is set in the same process as described above. This process is repeated until a newly set scanning line reaches the second guard bar Gb2. Since one or more new scanning lines are set, according to the present invention, the bar code can be read without fail even if the bar code region is highly distorted.

Figure 8:
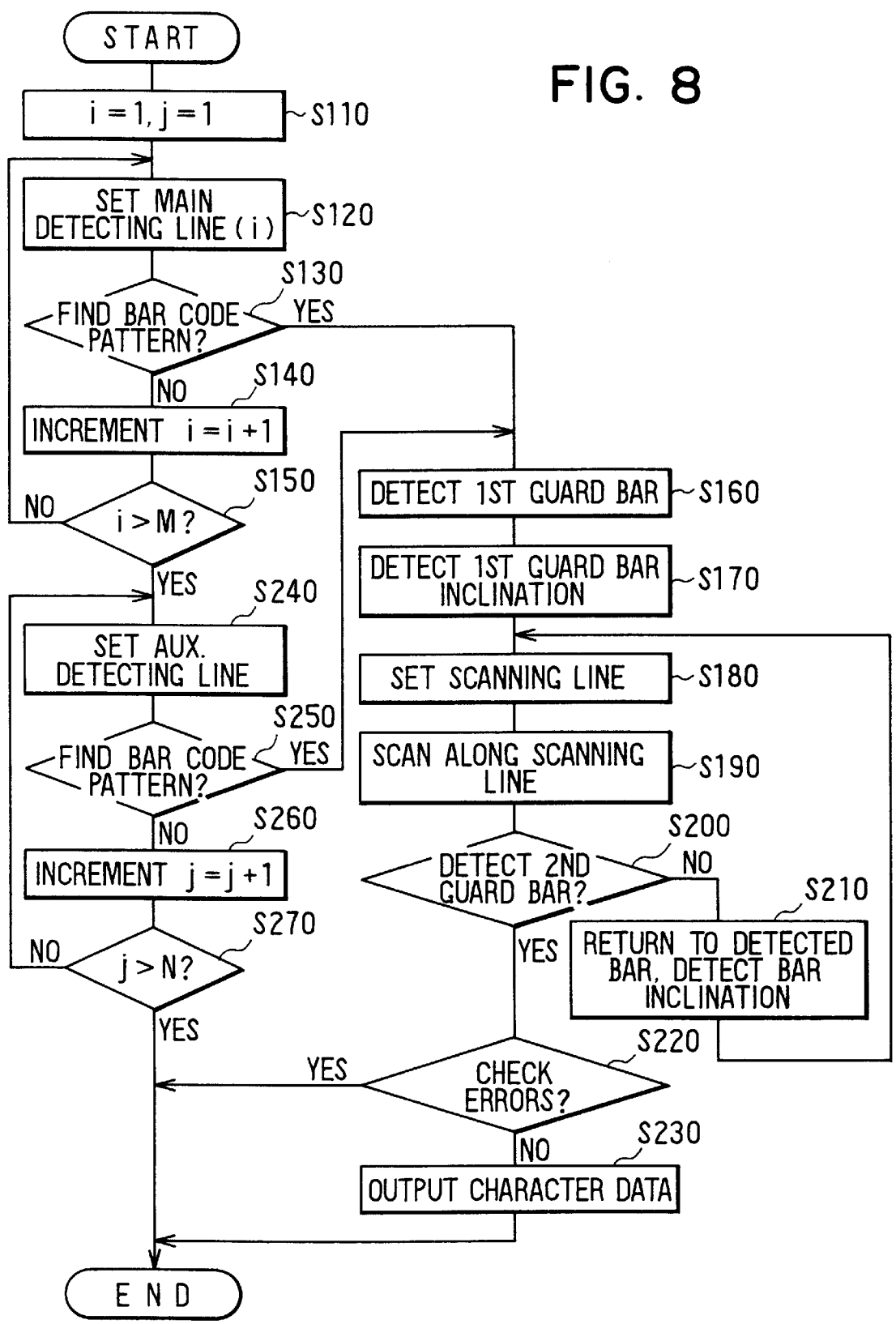
FIG. 8 is a flowchart showing a process of reading a bar code as the first embodiment of the present invention.

FIG. 8 shows the process of reading the bar code in detail, which is performed by the camera controller 10. At step S110, variables i and j are set at 1, respectively. At step S120, the main detecting line (i) is set. Then, at step S130, whether a pattern characteristic to the bar code is found out by scanning along the main detecting line (i) or not is determined. If the bar code pattern is not found, the process moves to step S140 where the variable i is incremented (i=i +1). At step S150, whether the variable i is larger than the preset number M of the main detecting lines is determined (i>M?). If the variable i is not larger than M (i≦M), the process returns to step S120, and the process to set another detecting line is repeated until the bar code pattern is found out by the detecting line. Since the possibility that the bar code pattern exists around the center line of the image region is high, the detecting line is first set around the center line, and then the setting of the detecting line moves outward from the center line.

If the bar code pattern is found out at step S130, the process moves to step S160 where the first guard bar Gb1 is detected. At step S170, the inclination of the guard bar Gb1 is detected, and the scanning line that is perpendicular to the first guard bar Gb1 is set at step S180 in the manner described above. At step S190, the bar code is scanned along the scanning line. At step S200, whether the second guard bar Gb2 is detected is determined. If the second guard bar Gb2 is not detected, the process moves to step S210. At step S210, the scanning line is traced backward to the last detected bar, and the inclination of the last detected bar is detected. Then, process returns to step S180 where a new scanning line is set perpendicularly to the last detected bar. Thereafter, the process is repeated until the second guard bar is detected.

On the other hand, if the second guard bar Gb2 is detected at step S200, the process moves to step S220. At step S220, whether any error is involved is determined. If no error exists, the process moves to step 230 where the detected bar code data are converted into character data, and the process is completed. If any error is found at step S220, the process is terminated.

If no bar code pattern is found out after using up all the preset main detecting lines (S150), the process moves to step S240. At step S240, the auxiliary detecting line (j) is set. Steps S240–S270 are repeated by incrementing j to a preset number N of the auxiliary detecting line (j) in the same manner as in incrementing the main detecting line (i). If the bar code pattern is found in the course of incrementing the auxiliary detecting line, the process moves to step S160. If no bar code pattern is found after using up all the auxiliary detecting lines (S270), the process is terminated. The auxiliary detecting line is first set around the center line of the image region and moves outward gradually in the same manner as in setting the main detecting line.

Though the process shown in FIG. 8 is completed or terminated after performing the process one time in the embodiment described above, it is possible to repeat the process two times or more and to complete or terminate it only after the same results are obtained to enhance accuracy of reading.

(Second Embodiment)

Figure 9:
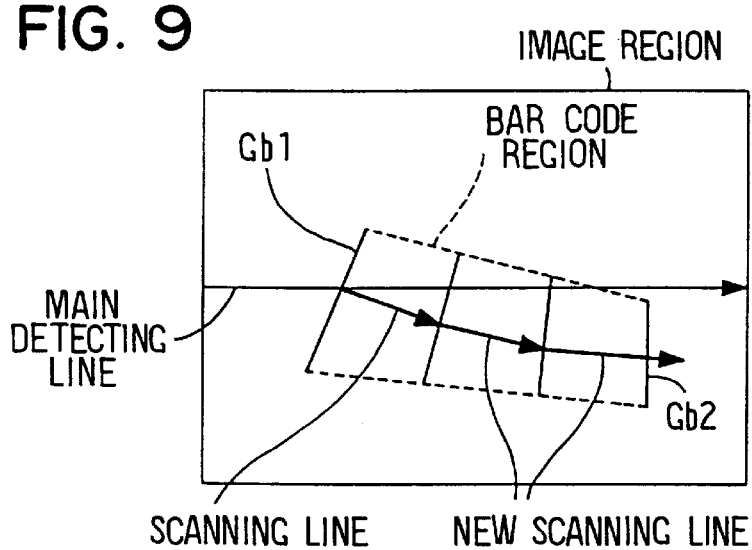
FIG. 9 is a chart illustrating a method of setting new scanning lines with predetermined intervals, as a second embodiment of the present invention.
Figure 10:
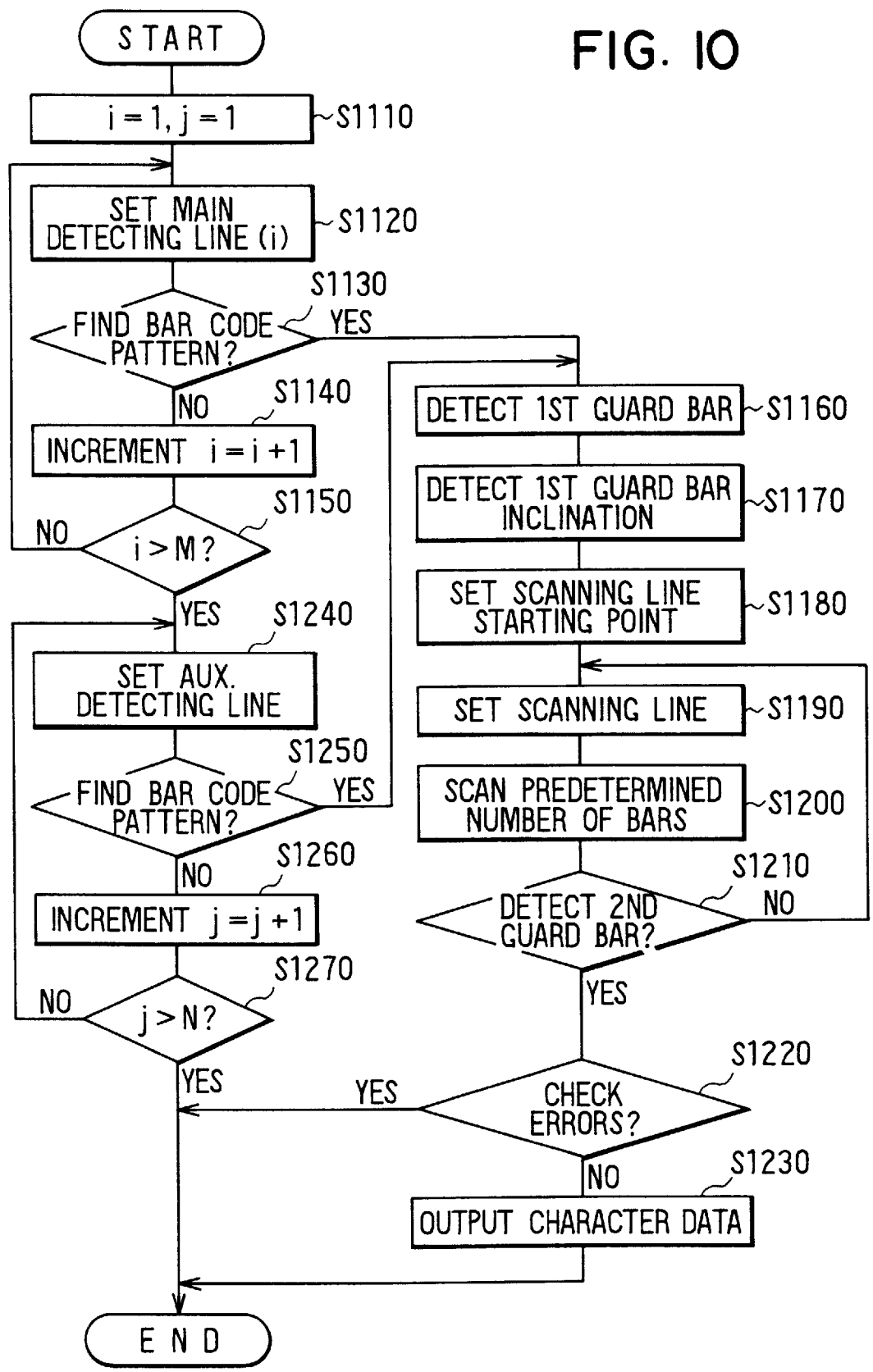
FIG. 10 is a flowchart showing a process of reading a bar code as the second embodiment of the present invention.

Referring to FIGS. 9 and 10, a second embodiment of the present invention will be described. In this embodiment, a new scanning line is set after a predetermined distance or a predetermined number of bars is scanned along the scanning line. As shown in FIG. 9, the original scanning line is set, so that it starts from the cross-point of the guard bar Gb1 and the main detecting line and extends perpendicularly to the guard bar Gb1. After a predetermined distance or a predetermined number of bar code bars is scanned with the original scanning, a first new scanning line is set so that it starts from the cross-point of the last bar scanned by the original scanning line and the original scanning line, and extends perpendicularly to the last scanned bar. After scanning a predetermined distance or number of bars, a second new scanning line is similarly set. This process is repeated until a newly set scanning line reaches the second guard bar Gb2. Though two newly set scanning lines are shown in FIG. 9, as many scanning lines as necessary can be set.

FIG. 10 is a flowchart showing a process of reading the bar code in detail according to the method briefly described above. This flowchart is similar to that shown in FIG. 8, except for steps S1180–S1210. Steps S1110–S1170 and S1220–S1270 in the second embodiment correspond to steps S110–S170 and S220–S270 in the first embodiment, respectively. Therefore, only steps S1110–S1170 will be explained here. After the inclination of the first guard bar Gb1 is detected at step S1170, a starting point of an original scanning line is set at the center of the first guard bar Gb1 at step S1180. Then, at step S1190, the original scanning line is set to start form the starting point and to extend perpendicularly to the first guard bar Gb1. At step S1200, a predetermined number of bar code bars are scanned along the original scanning line. At step S1210, whether the second guard bar Gb2 is detected or not is determined. If the second guard bar Gb2 is not detected, the process returns to step S1190. At step S1190, a new scanning line is set so that it starts from the last detected bar perpendicularly thereto. At step S1200, a predetermined number of bar code bars are scanned. At step S1210, whether the second guard bar Gb2 is detected is determined. If the second guard bar Gb2 is not yet detected, the process again returns to step S1190. Steps S1190–S1210 are repeated until a newly set scanning line detects the second guard bar Gb2. When the second guard bar Gb2 is detected, the process moves to step S1220.

Though a new scanning line is set after the predetermined number of bars are scanned in the process described above, it is possible to scan a predetermined distance. It is also possible to set the predetermined number of bars at one. As the predetermined number of bars becomes smaller or the predetermined distance becomes shorter, the number of processes for setting new scanning lines becomes larger and processing load becomes high, but the chance of scanning all of the bar code bars increases.

(Third Embodiment)

Figure 11:
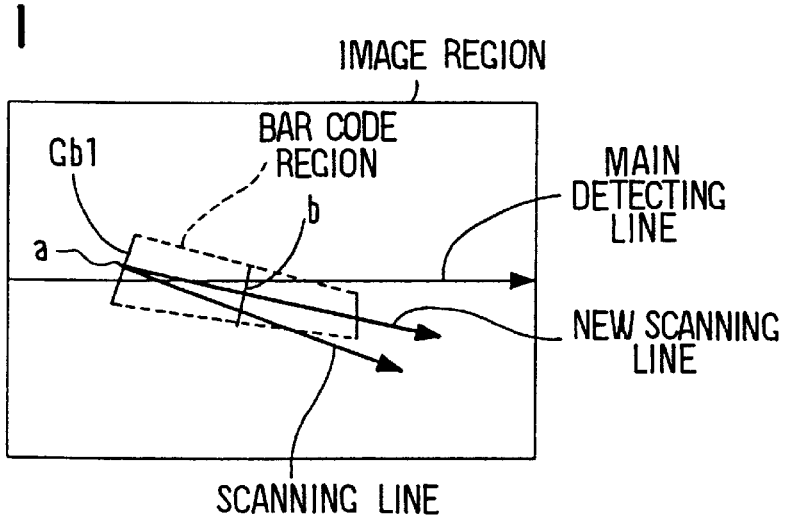
FIG. 11 is a chart illustrating another method of setting a new scanning line in the bar code region, as a third embodiment of the present invention.

A third embodiment of the present invention will be described with reference to FIG. 11. First, an original scanning line is set to start from a center "a" of the first guard bar Gb1 and to extend perpendicularly thereto. If the original scanning line goes out of the bar code region without reaching the second guard bar Gb2, the original scanning line is traced backward to the last bar detected by the original scanning line. Then, a new scanning line is set, so that the new scanning line starts from the center "a" on the first guard bar Gb1 and extends along a line connecting the center "a" and the center "b" of the last detected bar. The newly set scanning line is not perpendicular to the guard bar Gb1 in this case. If the newly set scanning line reaches the second guard bar Gb2, the scanning is completed. If not, other one or more new scanning lines are set in the similar manner until a new scanning line reaches the second guard bar Gb2. In this manner, the bar code can be read even if the bar code region is highly distorted.

Figure 12:
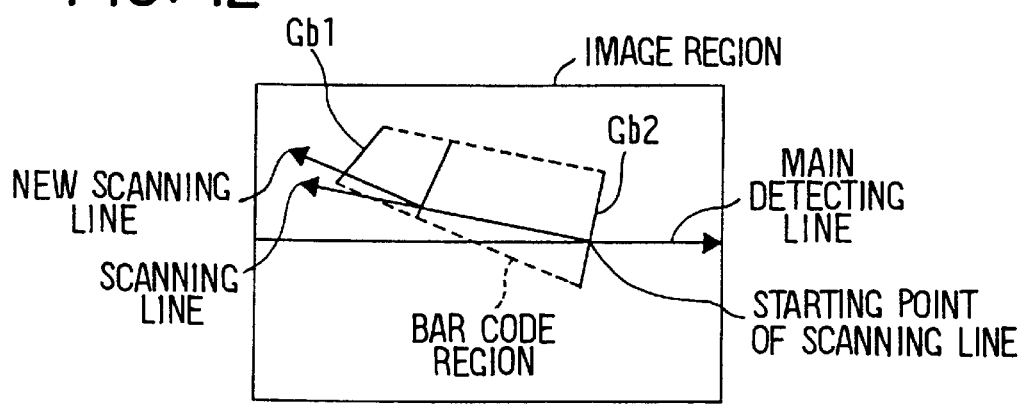
FIG. 12 is a chart illustrating a modified method of setting a new scanning line in the bar code region.

The embodiments described above may be variously modified. For example, the original scanning line may start from the second guard bar Gb2 and may extend toward the first guard bar Gb1 as shown in FIG. 12. This is because there is a possibility that the second guard bar Gb2 is first detected by the detecting line due to a relative position or angle between the bar code and the reader.

Figure 13:
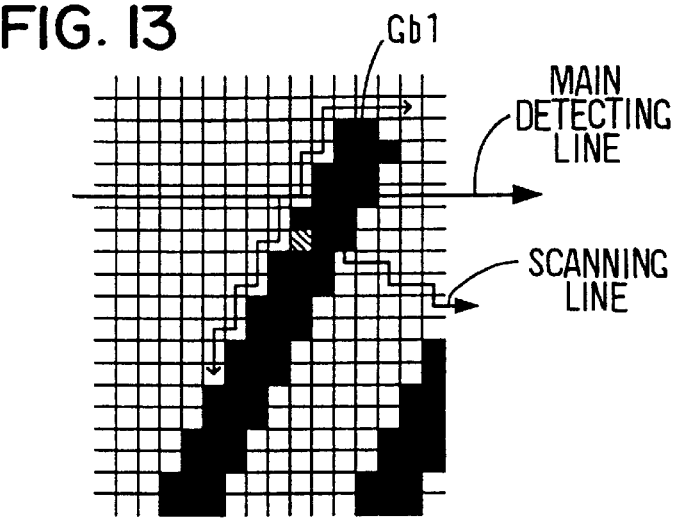
FIG. 13 is a chart showing a process for finding the first guide bar and for setting a scanning line in the bar code region.
Figure 14:
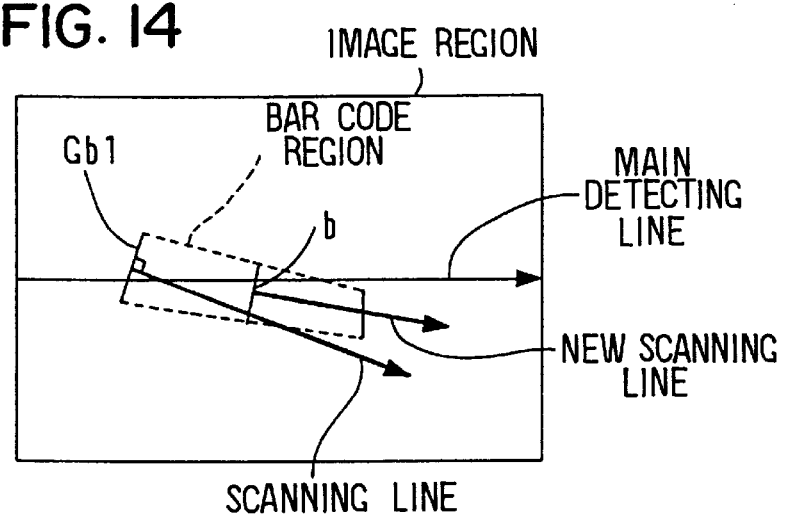
FIG. 14 is a chart illustrating another modified method of setting a new scanning line in the bar code region.
Figure 15:
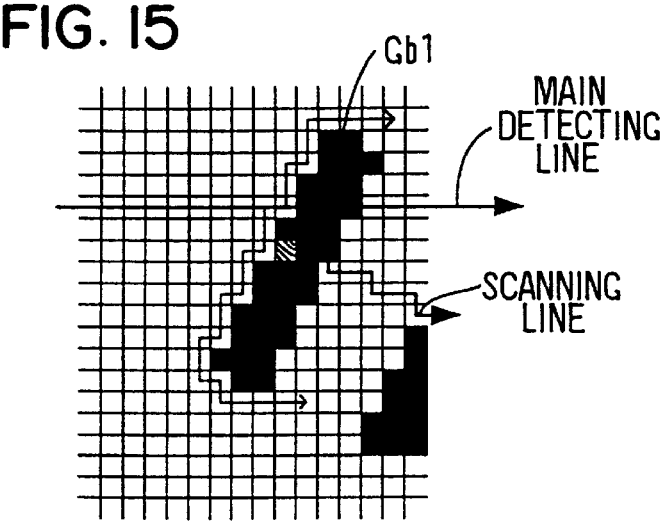
FIG. 15 is a chart showing another process for finding the first guard bar and setting a scanning line in the bar code region.
Figure 16A:
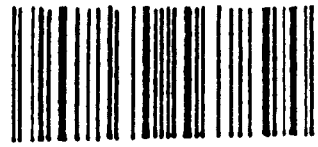
FIGS. 16A–16C are drawings showing examples of a bar code having a different shape and size.
Figure 16B:
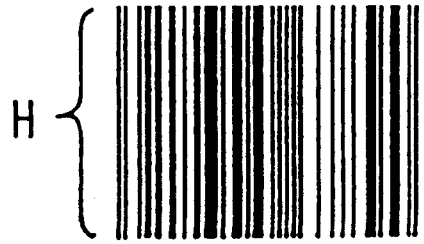
Figure 16C:
Figure 17A:
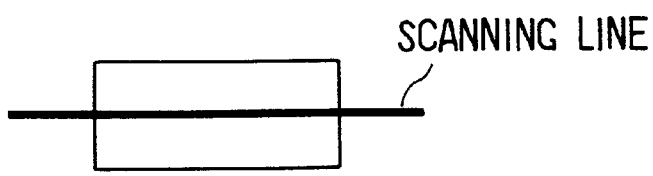
FIG. 17A is a schematic chart showing an ideal direction of a scanning line in a bar code region.
Figure 17B:
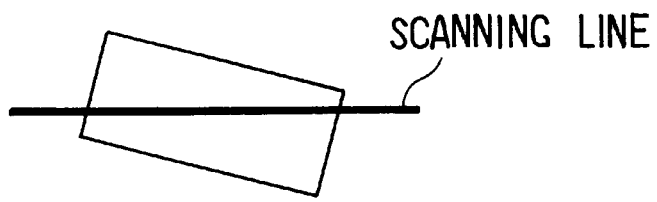
FIG. 17B is a schematic chart showing a direction of a scanning line in the bar code region, the bar code being still readable with the scanning line.
Figure 17C:
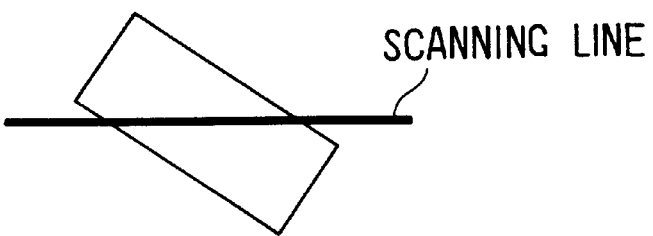
FIG. 17C is a schematic chart showing another direction of a scanning line in the bar code region, the bar code being unreadable with the scanning line.
Figure 18A:
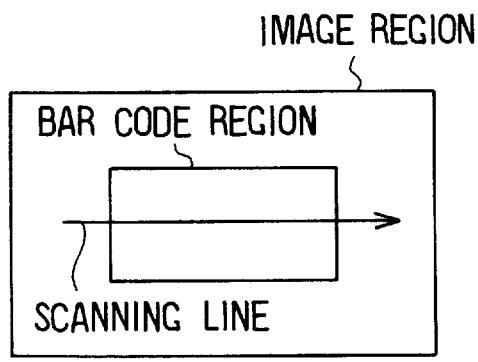
FIGS. 18A–18C are schematic charts showing various positions of a bar code region in an image region.
Figure 18B:
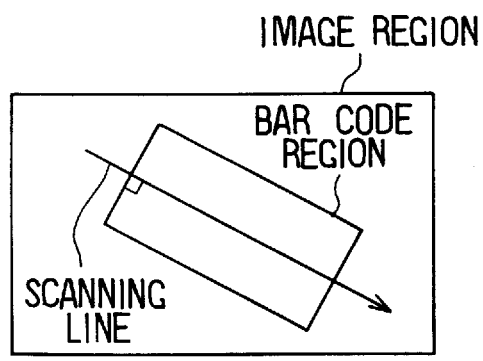
Figure 18C:
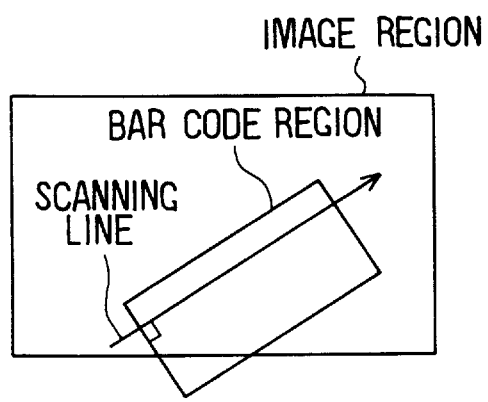
Figure 19A:
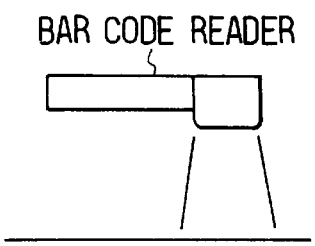
FIGS. 19A–19C are schematic views showing positions of a bar code reader relative to a bar code plane.
Figure 19A:
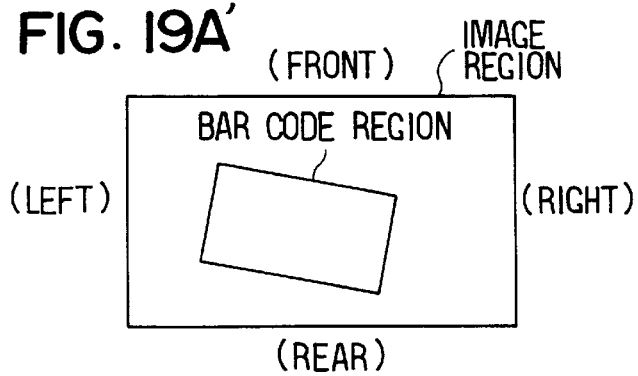
Figure 19B:
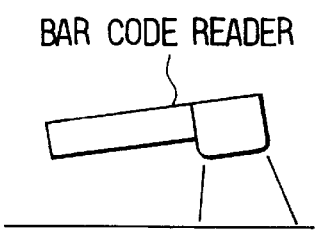
Figure 19B:
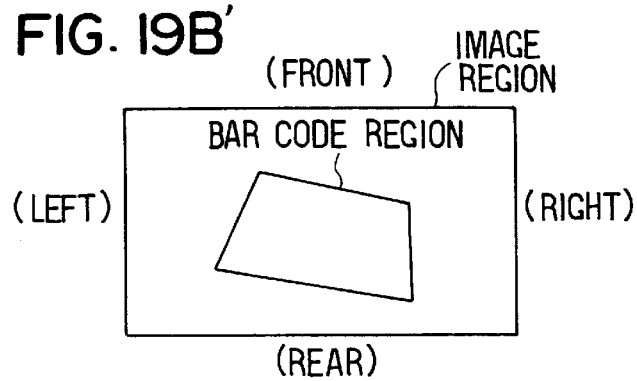
Figure 19C:
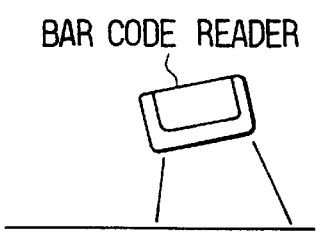
Figure 19C:
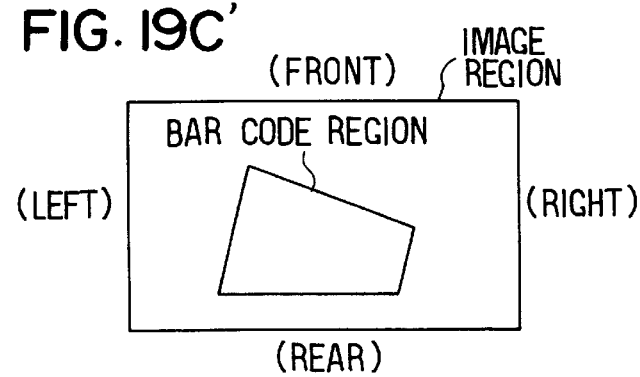
Figure 19D:
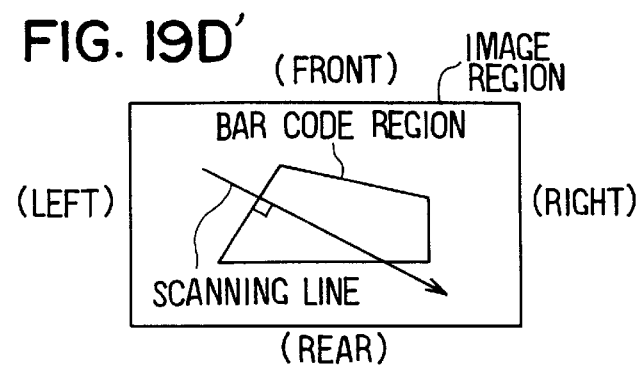
FIG. 19D' shows a shape of a bar code region, the bar code image being taken in by the bar code reader positioned with slanted angles both in the longitudinal and lateral directions (a combined position of FIGS. 19B and 19C).

In the first embodiment, the starting point of the original scanning line is set at the cross-point of the first guard bar Gb1 and the detecting line, and similarly the starting point of the new scanning line is set at the cross-point of the original scanning line and the bar last detected by the original scanning line. If those starting points are located close to the sides of the bar code region and apart from the center line, they may be moved toward the center by a predetermined distance. Alternatively, those starting points may be moved to the center of the first guard bar Gb1 or to the center of the bar last detected by a previous scanning line, as shown in FIG. 14. Moving the starting point of the original scanning line to the center of the first guard bar is especially desirable when the length of the guard bar is short as shown in FIG. 15. The reason for moving the starting point toward the center or to the center is that the inclination of the first guard bar may not be properly determined, if the cross-point is located close to a side of the bar code region as shown in FIG. 13. Moreover, it is highly possible that the scanning lines easily go out of the bar code region if they start from the point close to the side of the bar code region.

(Fourth Embodiment)

A fourth embodiment of the present invention will be described with reference to FIGS. 20–30C. In the foregoing embodiments, a whole image region taken into the bar code reader by the CCD area sensor 11 is thoroughly scanned by detecting lines to find out the bar code region having guard bars. In this fourth embodiment, the bar code region is searched by preliminary scanning the image region before the detecting lines are set.

Figure 20:
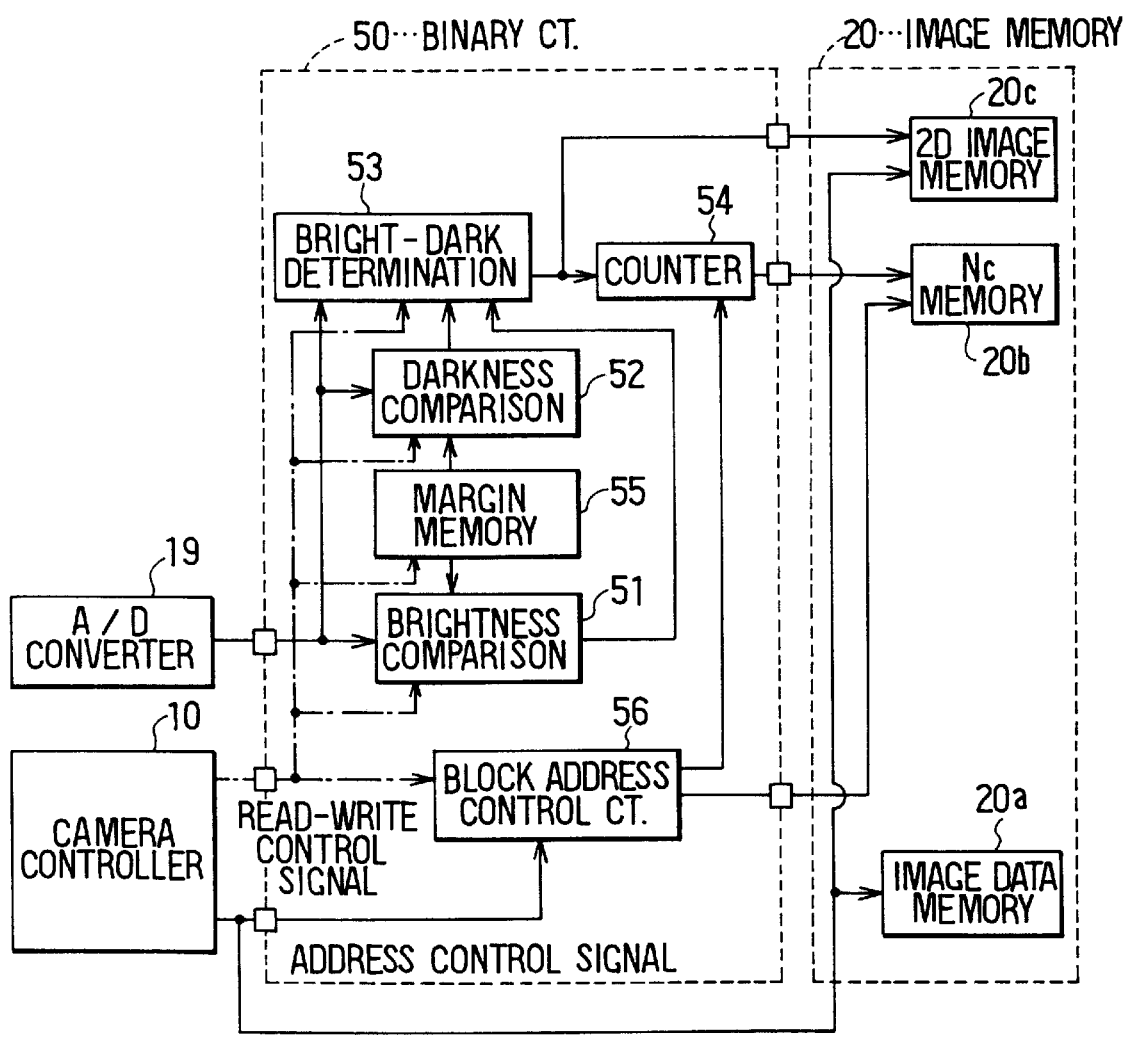
FIG. 20 is a block diagram showing a binary circuit used in the bar code reader shown in FIG. 1, the binary circuit being. modified to be suitable for a fourth embodiment of the present invention.

The bar code reader used in the fourth embodiment is similar to that of the first embodiment, shown in FIG. 1, but the binary circuit 17 is replaced with a binary circuit 50 shown in FIG. 20, and the circuitry is somewhat modified as shown also in FIG. 20. The digital image data converted by the A/D converter 19 is also fed to the binary circuit 50, and read-write control signals and address control signals are supplied to the binary circuit 50 from the camera controller 10. The image memory 20 includes an image data memory 20a, an Nc memory (for memorizing the number of brightness changes) 20b and a 2-dimensional image memory 20c. The image data memory 20a stores digital image data fed from the A/D converter 19. The functions of the Nc memory 20b and the 2-dimensional image memory 20c will be described later.

Figure 21:
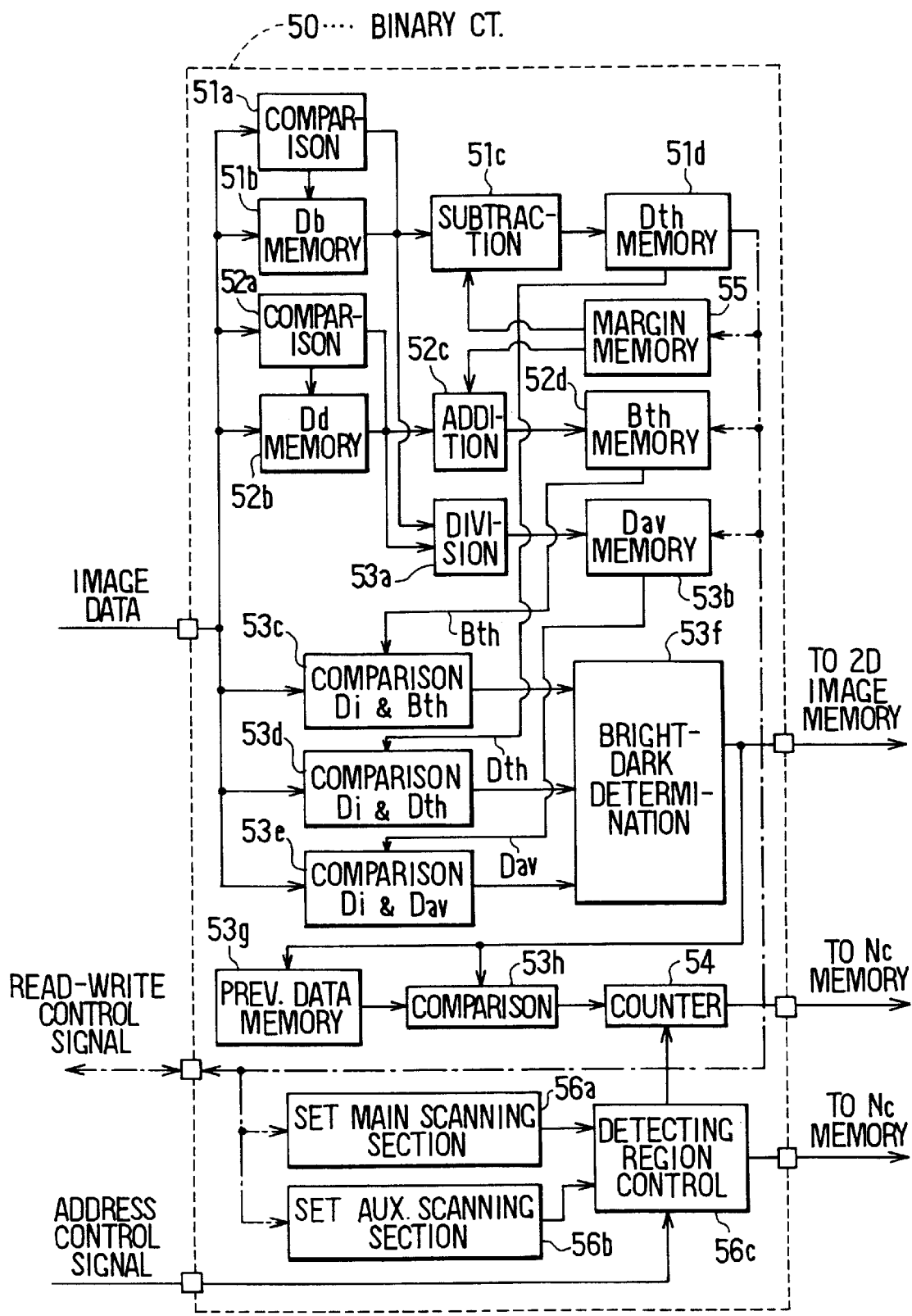
FIG. 21 is a detailed block diagram showing the binary circuit shown in FIG. 20.

Referring to FIGS. 20 and 21, the binary circuit 50 will be described in detail. FIG. 20 shows its components in terms of function, while FIG. 21 shows its circuit components in detail. As shown in FIG. 20, the binary circuit 50 includes blocks for brightness comparison 51, darkness comparison 52 and bright-dark determination 53. It also includes a counter 54, a margin memory 55 and a block-address control circuit 56. The digital image data are fed to the blocks 51, 52 and 53 from the A/D converter 19. Outputs of the brightness comparison block 51 and the darkness comparison block 52 are fed to the bright-dark determination block 53, and the output of the bright-dark determination block 53 is fed to the counter 54 and the 2-dimensional image memory 20c. The output of the counter, i.e., the number of counts is supplied to the Nc memory 20b. The read-write control signal from the camera controller 10 is fed to the brightness comparison block 51, the darkness comparison block 52, the bright-dark determination block 53, the margin memory 55 and the block-address control circuit 56, respectively. The address control signal from the camera controller 10 is fed to the block-address control circuit 56 which in turn supplies a control signal to the Nc memory 20b. The address control signal from the camera controller 10 is also fed to the image data memory 20a and the 2-dimensional image memory 20c.

Details of the binary circuit 50 will be explained with reference to FIG. 21. The brightness comparison block 51 is composed of a comparison block 51a, a brightest data memory (Db memory) 51b, a subtraction block 51c and a dark threshold memory (Dth memory) 51d. The darkness comparison block 52 is composed of a comparison block 52a, a darkest data memory (Dd memory) 52b, an addition block 52c and a bright threshold memory (Bth memory) 52d. The bright-dark determination block 53 includes a division block 53a, an average data memory (Dav memory) 53b, a Di-Bth comparison block 53c, a Di-Dth comparison block 53d, a Di-Dav comparison block 53e, a bright-dark determination block 53f, a previous data memory 53g and a comparison block 53h. The bright-dark determination block 53f determines whether input data (Di) are bright or dark, based on the outputs fed from the blocks 53c, 53d and 53e. The block-address control circuit 56 is composed of a main scanning section setting block 56a, an auxiliary scanning section setting block 56b and a detecting region control block 56c.

The operation of the brightness comparison block 51 will be explained with reference to FIG. 21. The digital image data from the A/D converter 19 are fed to the comparison block 51a and the Db memory 51b. The comparison block 51a also receives the output from the Db memory 51b. The comparison block 51a compares new input data Di sequentially fed thereto with previous input data and selects the brightest data Db among them. That is, the comparison block 51a always renew the brightest data Db and supplies its output corresponding to Db to the Db memory 51b. In other words, the Db memory 51b always renews the previously stored data to the brightest data Db and memorizes it therein. In this particular embodiment, brightness is divided into 15 levels, 1–15, the level 15 being the brightest and the level 1 the darkest. The subtraction block 51c subtracts a dark margin (e.g., 5) fed from the margin memory 55 from the brightest data Db, and its output is fed to the Dth memory 51d which memorizes the value Dth (e.g.,Db−5). Dth is a threshold level to determine that an input data Di is dark only when Di≦Dth.

The darkness comparison block 52 operates as follows. The digital image data is fed to the comparison block 52a and the Dd memory 52b from the A/D converter 19. The comparison block 52a also receives the output from the Dd memory 52b. The comparison block 52a compares new input data Di sequentially fed thereto with previous input data and selects the darkest data Dd among them. That is, the comparison block 52a always renew the darkest data Db and supplies its output corresponding to Dd to the Dd memory 52b. In other words, the Dd memory 52b always renews the previously stored data to the new darkest data Dd and memorizes it therein. The addition block 52c adds a bright margin (e.g., 5) supplied from the margin memory 55 to the darkest data Dd, and its output is fed to the Bth memory 52d which memorizes the value Bth (e.g.,Dd+5). Bth is a threshold level to determine that an input data Di is bright only when Di≧Bth.

The operation of the bright-dark determination block 53 will be described with reference to FIG. 21. The brightest data Db and the darkest data Dd are fed to the division block 53a where both data are added and then divided by 2. Namely, the division block 53a calculates an average data Dav=(Db+Dd)/2. Then, the average data Dav is memorized in the Dav memory 53b. The digital image data Di are supplied to the Di-Bth comparison block 53c, the Di-Dth comparison block 53d and the Di-Dav comparison block 53e, respectively. The results of comparison are fed to the bright-dark determination block 53f. The bright-dark determination block 53f determines whether the input data Di is bright or dark in the following manner. If Di≧Dav and Di≧Bth, then it is determined that the input data Di is bright. On the other hand, if Di<Dav and Di≦Dth, then it is determined that the input data Di is dark. If an input data Di falls out of both ranges, the determination block 53f does not make determination, and a previous determination is used as its output. The determination block 53f outputs a signal 1 when Di is bright and a signal 0 when Di is dark. The determination block 53f feeds the signals indicating "bright or dark" to the 2-dimensional image memory 20c and also to the previous data memory block 53g and the comparison block 53h. The comparison block 53h compares a newly supplied signal indicating "bright or dark" with an immediately previous signal and delivers its output only when the new signal is different from the previous one. That is, the comparison block 53h feeds its output to the counter 54 only when the input data Di changes its brightness from bright to dark, or from dark to bright. The number of such changes Nc is counted by the counter 54, and Nc is fed to the Nc memory 20b.

The operation of the block address control block 56 will be explained with reference to FIG. 21. The detecting region control block 56c controls a region to be detected, based on the address control signal from the camera controller 10, and also based on signals from the main scanning section setting block 56a and the auxiliary scanning section setting block 56b. That is, it controls addresses for the number of changes Nc in each detecting section which is detected by both the main and auxiliary scanning lines and also controls the counter 54. The detecting region control block 56c also delivers its control signal to the Nc memory 20b. Both the setting blocks 56a and 56b are controlled by the read-write signal from the camera controller 10. The read-write signal also controls the Dth memory 51d, the Bth memory 52d, the Dav memory 53b and the margin memory 55.

Figure 22:
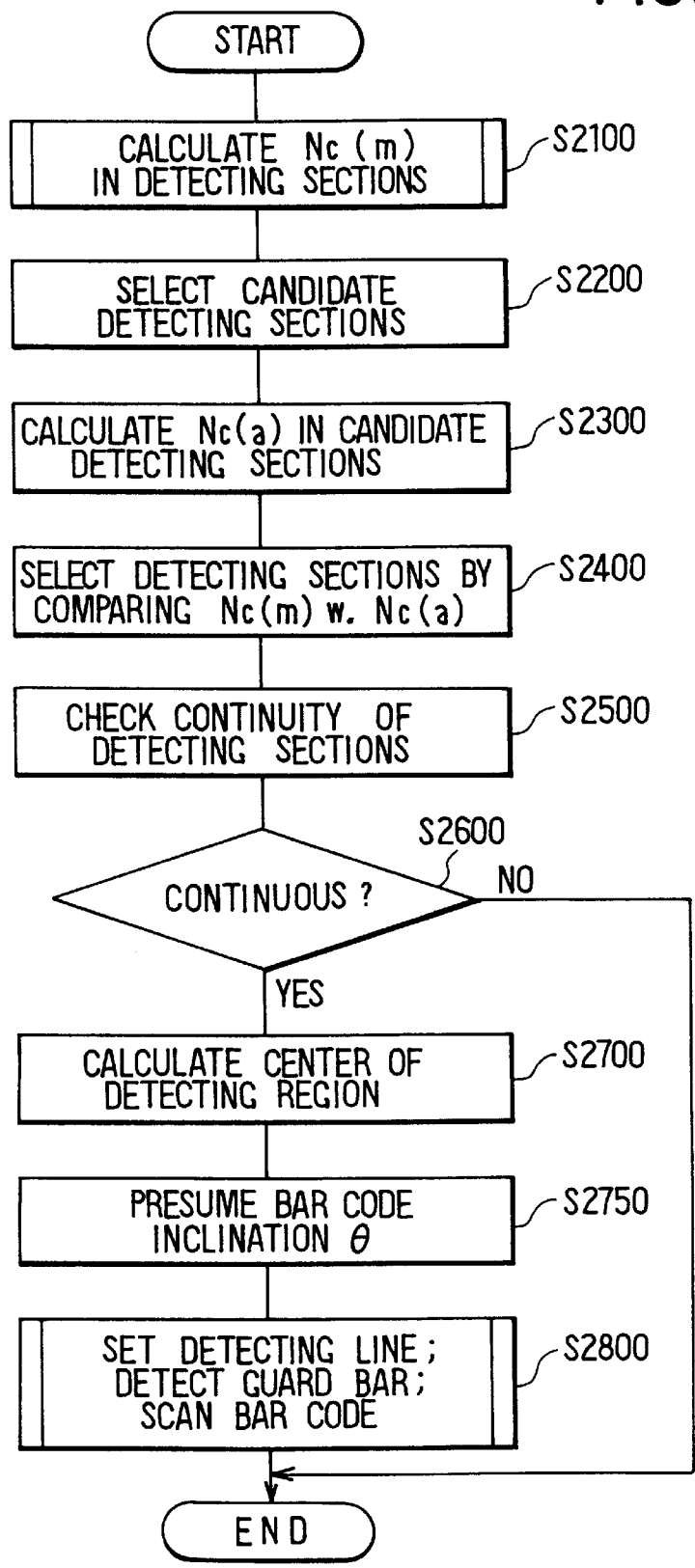
FIG. 22 is a flowchart showing a main process of reading a bar code in the fourth embodiment.

A process for reading a bar code that is carried out by the camera controller 10 will be described with reference to FIG. 22 and other related drawings. In this embodiment, as opposed to the embodiments 1, 2 and 3 described above, a whole image region taken in by the CCD area sensor 11 is not thoroughly searched by the detecting lines to find out the guard bars located at sides of the bar code. The image region is divided into plural detecting sections and the number of brightness changes Nc in each section is counted by preliminarily scanning the image region. The location of bar code region in the image region is determined, or estimated, based on Nc.

Figure 23:
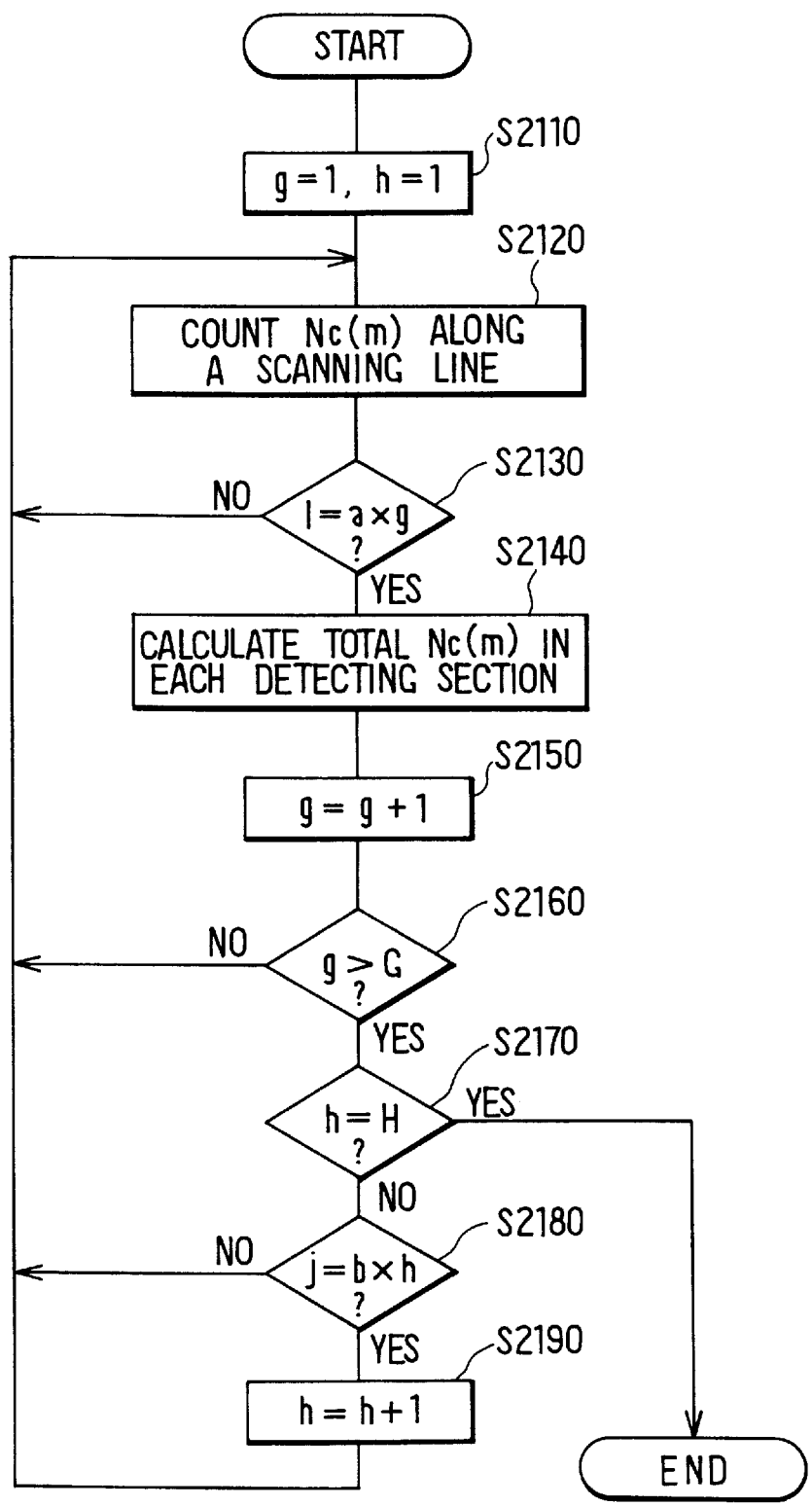
FIG. 23 is a flowchart showing a process of counting the number of brightness changes in main scanning.

The first step S2100 of FIG. 22, in which the number of changes Nc(m) in the main scanning direction is calculated, will be explained with reference to FIGS. 23–24C. As shown in FIG. 24A, a whole image region is divided into G×H detecting sections, each having a rectangular shape. Main scanning lines run in the horizontal direction, and auxiliary scanning lines in the vertical direction in the drawing. By dividing the image region in this manner, data processing becomes easier because the CCD area sensor 11 has a pixels arranged in a matrix. Each detecting section is further divided into a×b small sections, each of which constitutes a pixel. In an actual device, the number of pixels is usually in an order of 640×480, and the image region is divided into the same number of the small sections. However, for convenience of illustration and explanation, a model having 80 (G=10, H=8) detecting sections, each having 64 small sections (a=b=8), is shown in FIG. 24A. The following explanation will be done based on this model.

One detecting section having 64 small sections is shown in FIG. 24B. Each detecting section is scanned by eight main scanning lines in the horizontal direction. Each scanning line detects brightness changes caused by bar codes and spaces in a bar code. In an example shown in FIG. 24B, the first scanning line detects 4 brightness changes (that is, Nc(m)=4; Nc(m) means Nc in the direction of the main scanning line), and the second scanning line detects 4 brightness changes (Nc(m)=4). Similarly, the number of changes Nc(m) is 4, 4, 4, 4, 4, 3, 3, 3, respectively from the top, and the total number of Nc(m) in this particular detecting section is 29. The total Nc(m) in other detecting sections is counted in the same manner.

Though the method of counting Nc is already outlined with reference to FIGS. 20 and 21, it will be further explained in detail. The following table is an example showing brightness data and calculated values along a given main scanning line.

| Input data No. | 1 | 2 | 3 | 4 | 5 | 6 | 7 | 8 |
|---|---|---|---|---|---|---|---|---|
| Input data (Di) | 15 | 15 | 8 | 1 | 1 | 1 | 8 | 15 |
| Brightest data (Db) | 15 | 15 | 15 | 15 | 15 | 15 | 15 | 15 |
| Darkest data (Dd) | 15 | 15 | 8 | 1 | 1 | 1 | 1 | 1 |
| Average data (Dav) | 15 | 15 | 12 | 8 | 8 | 8 | 8 | 8 |
| Dark threshold (Dth) | 10 | 10 | 10 | 10 | 10 | 10 | 10 | 10 |
| Bright threshold (Bth) | 20 | 20 | 13 | 6 | 6 | 6 | 6 | 6 |
| Determination | x | x | D | D | D | D | B | B |

As mentioned above, the brightness of the input data Di is ranked into 15 levels (level 1 is the darkest and level 15 is the brightest). In the last row showing the determination as to "bright or dark," x means no determination is made, D means dark, and B means bright. The input data Di is determined as bright if $Di \geq Dav$, and $Di \geq Bth$. It is determined as dark if $Di < Dav$, and $Di \leq Dth$. If the input data Di falls out of both ranges, no determination is made and a previous determination is carried over. In this example, Dth is calculated by subtracting 5 from Db (Dth=Db−5), and Bth is calculated by adding 5 to Dd (Bth=Dd+5).

As to input data 1 and 2, Db=15, Dd=15, Dav=15, Dth=10 and Bth=20, because Di is 15. No determination is made because they are out of both bright and dark ranges. When No.3 data of level 8 is input, Dd is renewed to 8 while keeping Db at 15, and Dav becomes 12 ((15+8)/2=11.5; decimal numbers are regarded as 1.0). No.3 data is determined as dark because it falls within the dark range, and the number of changes NC is counted as 1 at this point, because determination is changed from "x" to "dark." When No.4 data of level 1 is input, Dd is renewed to 1 while keeping Db at 15, and accordingly Dav becomes 8. Since the input data of the highest level 15 and the lowest level 1 have been already input by this point, Db, Dd and Dav are not renewed hereafter. Accordingly, Dth and Bth are not renewed hereafter. No.4 data is judged as dark because it is within the dark range. When No.7 data of level 8 is input, this input data is determined as bright, because $Di=8 \geq Dav=8$ and $Di=8 \geq Bth=6$. Nc is accumulated and becomes 2 at this point, because "dark" changes to "bright." No.8 data of level 15 is determined also as bright, and Nc does not change. After data No.4, an input data Di of level 8 or higher is always determined as bright and an input data Di of level 7 or lower is always determined as dark, because data having the highest level 15 and the lowest level 1 have been input by that point, and Dav, Dth and Bth are maintained at 8, 10 and 6, respectively.

Now, step S2100 (shown in FIG. 22), in which Nc(m) in the detecting sections is counted, will be described in detail with reference to FIG. 23. At step 2110, both variables g and h are set at initial value 1, and the Ith image data is detected along the Jth main scanning line to count the accumulated number of changes Nc(m) at step S2120. At step S2130, whether I (indicating a position of detected image data) equals to a×g or not is determined. In other words, g sections have been scanned or not is determined at this step. If I is less than a×g, the process returns to step S2120, and if I becomes equal to a×g, the process proceeds to step S2140. At step S2140, the accumulated count Nc(m) obtained at step S2120 is added to the Nc(m) count of detecting section (g,h), and the added count is memorized. At step S2150 the variable g is incremented (g=g+1), and at step S2160 whether g is larger than G (the number of detecting sections along the main scanning line) or not is determined. If g>G (this means that a whole horizontal length of the image region has been scanned), the process proceeds to step S2170. If not, the process returns to step S2120. At step S2170, whether h equals to H or not is determined. If h=H (this means that a whole vertical length of the image region has been scanned), a whole step S2100 is completed and the process proceeds to step S2200 (FIG. 22). If h is not equal to H, the process proceeds to step S2180. At step S2180, whether J equals to b×h or not is determined. If J=b×h (this means that h sections in the vertical direction are all scanned along the main scanning line), the process proceeds to step S2190. If not, the process returns to step S2120. At step S2190, the variable h is incremented (h=h+1), and then the process returns to step S2120.

When step S2100 is completed, the respective number of changes Nc(m) in all detecting sections (G×H sections; 10×8=80 in this particular example) is obtained. An example of Nc(m) in all detecting sections is shown in FIG. 24C. If the scanning line crosses a dark bar and a white space, a bright-dark change is detected, while no such change is detected if a large dark area representing an image other than the bar code is scanned. Therefore, it is highly probable that the bar code region is located in the detecting sections having a higher number of brightness changes Nc(m). In this respect, at step S2200 (FIG. 22), each Nc(m) in all sections is compared with a predetermined number, and sections having higher Nc(m) are selected as candidate detecting sections for which auxiliary scanning is further performed. In this particular example shown in FIG. 24C, the predetermined number to be compared with counted Nc(m) is set at 6. The candidate detecting sections having Nc(m) of 6 or higher are shown by hatching.

At step S2300 (FIG. 22), only the candidate detecting sections are scanned by the auxiliary scanning line in the vertical direction, and the number of brightness changes Nc(a) along the auxiliary scanning line is counted in the same manner as in main scanning. An example of Nc(a) in a given candidate detecting section is shown in FIG. 24B. This section is scanned by 8 auxiliary scanning lines, and Nc(a) along each scanning line is counted as shown. That is, 1, 1, 1, 2, 1, 0, 0, 1 from left to right. The total Nc(a) in this particular section is 7.

At step S2400 (FIG. 22), a ratio of Nc(m) to Nc(a) in each candidate detecting section is calculated. For example, in the section shown in FIG. 24B, Nc(m) is 29 and Nc(a) is 7, and the their ratio Nc(m)/Nc(a) is 29/7. Then, the candidate detecting sections having similar Nc(m)/Nc(a) ratios (i.e., the ratios are within a predetermined range) are selected from among the candidate detecting sections as detecting sections constituting a detecting region in which the bar code is located with a high probability. When the bar code is actually included in a given candidate section, the Nc(m)/Nc(a) ratio does not change much even if the number of bars and spaces varies. This is because the candidate sections having similar Nc(m)/Nc(a) ratios are selected as the detecting sections.

Figure 25A:
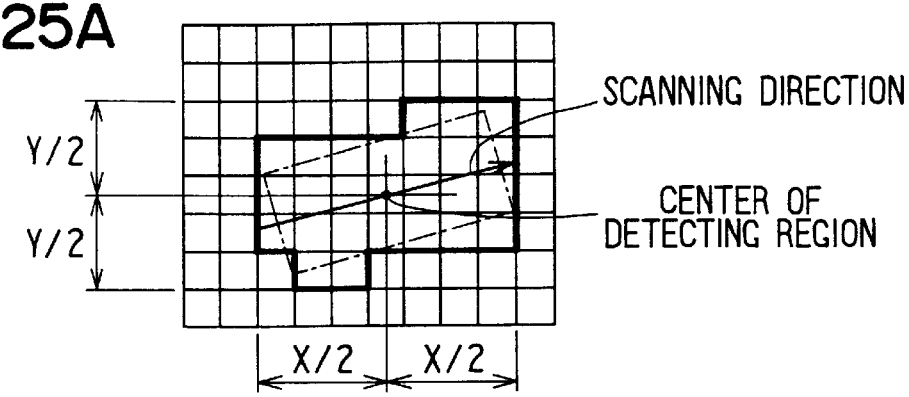
FIG. 25A is a schematic chart showing a detecting region in an image region and a center of the detecting region.
Figure 25B:
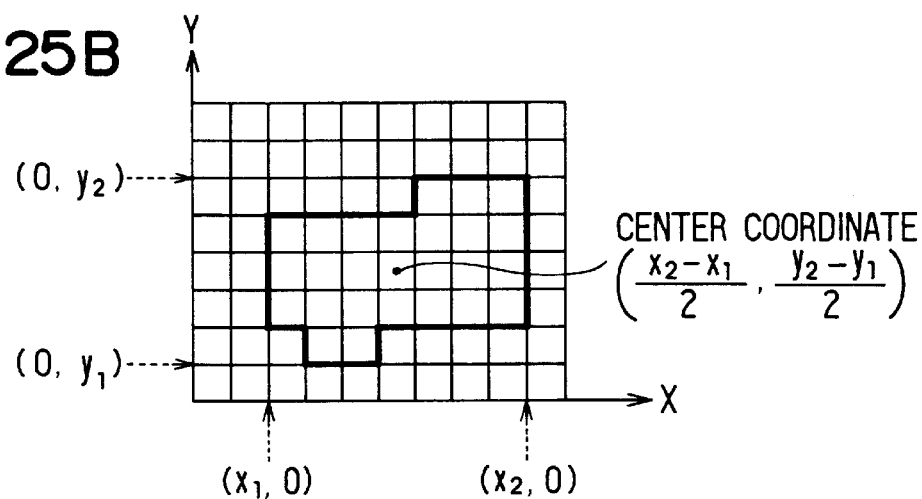
FIG. 25B is a schematic chart showing a method of calculating the center of the detecting region.

At step S2500 (FIG. 22), whether the selected detecting sections form a continuous single region or not is checked. If a continuous detecting region is formed, the process proceeds to step S2700. If not this process is terminated. At step S2700, a center coordinate of the detecting region is calculated. Referring to FIGS. 25A and 25B, a method of calculating the center coordinate will be explained. The detecting region is encircled by a solid line. It is highly probable that a bar code region as encircled by a dotted line is included in the detecting region. The width of the detecting region in the main scanning direction is X, and the width in the auxiliary scanning direction is Y. As shown in FIG. 25B, the X-axis is set along the bottom line of the image region and the Y-axis is set along the left side line of the image region. The coordinate of the left side line of the detecting region is $(x_1, 0)$, and that of the right side line is $(X_2, 0)$. Similarly, the coordinate of the top line of the detecting region is $(0, y_2)$, and that of the bottom line is $(0, y_2)$. The coordinate of the detecting region center is calculated based on those coordinates, and is expressed as $((x_2-x_1)/2, (y_2-y_1)/2)$.

Figure 26:
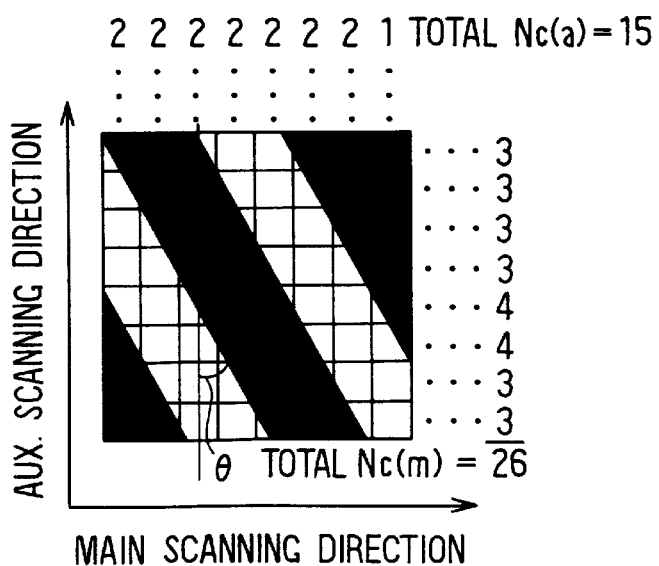
FIG. 26 is a schematic chart showing a method of calculating a bar code inclination based on the number of brightness changes.

At step S2750 (FIG. 22), a bar code inclination $\theta$ is calculated. The bar code inclination $\theta$ is an angle made by the auxiliary scanning direction and a bar or space in the bar code, as shown in FIG. 26. The inclination $\theta$ is not actually measured, but is calculated based on the number of changes Nc(m), Nc(a) counted in the previous steps S2100 and S2300 according to the following formula: $\tan\theta = Nc(a)/Nc(m)$. Instead of mathematical proof of this relation, this relation will be explained according to an example shown in FIG. 26. In this example, the bar inclination $\theta$ is 30°. The detecting section is scanned by 8 main scanning lines and 8 auxiliary scanning lines in the same manner as shown in FIG. 24B. As a result of scanning, the total Nc(a) of 15 and the total Nc(m) of 26 are counted. Since Nc(a)/Nc(m)=15/26≈0.576, and $\tan\theta \approx 0.577$, both are substantially equal. In this manner the bar inclination $\theta$ is calculated from the ratio Nc(a)/Nc(m).

At step S2800 (FIG. 22), the detecting line is set in the detecting region to find out the guard bar, and the bar code is read along a reading scanning line that is set perpendicularly to the guard bar. This process will be described with reference to FIG. 27 that shows detailed steps included in step S2800. At step S2810, variable i is set at 1, and detecting line (i) is set at the next step S2820. The first detecting line (i=1) is set, so that it passes the detecting region center previously calculated and extends perpendicularly to the bar having its inclination $\theta$ ($\theta$ is previously calculated), as shown in FIG. 28A. Then, at step S2830, the detecting region is scanned by the first detecting line to detect whether the bar code pattern is present or not. If the bar code pattern is not found, the variable i is incremented at step S2840. At step S2850, whether i is larger than M (a predetermined number representing the total number of detecting lines to be set) or not is detected. If i is not larger than M, the process returns to step S2820 to set another detecting line. This is repeated until the bar code pattern is found by the detecting lines. In an example shown in FIG. 28A, the second (i=2), third (i=3) . . . detecting lines are set in parallel to the first detecting line (i=1). Since it is most probable that the bar code pattern is found along the first detecting line passing the detecting region center, the detecting lines are sequentially set from the center toward outside, as shown in FIG. 28A. It is also possible to set detecting lines as shown in FIG. 28B. In FIG. 28B, the first scanning line (i=1) is set so that it passes the center (or a point very close to the center) and extends perpendicularly to the bar inclination in the same manner as in FIG. 28A, and the other detecting lines (i=2, 3 . . . ) are set to extend in directions not in parallel to the first detecting line though they all pass the center of the detecting region. Other detecting lines are set in such an order that the angle relative to the first detecting line sequentially increases.

Referring to FIG. 27 again, if the bar code pattern is found at step S2830, the process proceeds to step S2860. At step S2860, the first guard bar Gb1 is detected by the detecting line. At step S2870, the scanning line for reading the bar code is set in the direction parallel to the first detecting line set at step S2820. The scanning line is set in parallel to the first detecting line in both cases shown in FIGS. 28A and 28B, because the scanning line runs perpendicularly to the guard bar Gb1 and bar code bars by so setting the scanning lines.

At step S2880, the bar code is scanned along the scanning line. At step S2890, whether the second guard bar Gb2 is found or not is detected. If the second guard bar is not found, the process moves to step S2900. At step S2900, the originally set scanning line is traced back to the last detected bar, and the inclination of the last detected bar is detected. Then, the process returns to step S2870 where a new scanning line is set in the direction perpendicular to the last detected bar. This loop is repeated until the second guard bar Gb2 is found. If the second guard bar Gb2 is found at step S2890, whether or not any errors are involved is checked at step S2910. If no error is involved, the process proceeds to step S2920 where the read data are converted into character data, thus completing the reading process. If any error is found at step S2920, the process is terminated. On the other hand, the determination of step S2850 is affirmative, i.e., no bar code pattern is found after all the detecting lines are used up, this process is terminated.

Advantages of the fourth embodiment are summarized as follows. The image region is preliminary searched to find out the most probable bar code region in the image region. Such a bar code region is selected as a detecting region. The detecting lines for detecting the guard bars Gb1, Gb2 are set only in the detecting region, not covering a whole image region. Therefore, the process of detecting guard bars is simplified. In selecting the detecting region, a whole image region is divided into plural detecting sections and the number of brightness changes Nc (Nc(m) and Nc(a)) in each section is digitally counted, and then Nc is digitally processed. Therefore, the total time required to read a bar code is shortened. Since the detecting line is set perpendicularly to the bar inclination, the scanning line for reading the bar code can be easily set in parallel to the detecting line. Since the bar inclination is calculated based on a ratio of Nc(a) to Nc(m) without actually detecting the inclination itself, process efficiency is enhanced. Since the detecting line direction in the fourth embodiment is selected based on the bar inclination, it is not necessary to set detecting lines both in the horizontal and vertical directions as done in the first embodiment. Therefore, the process of finding guard bars in the bar code region is further simplified.

(Modifications of Fourth Embodiment)

Figure 27:
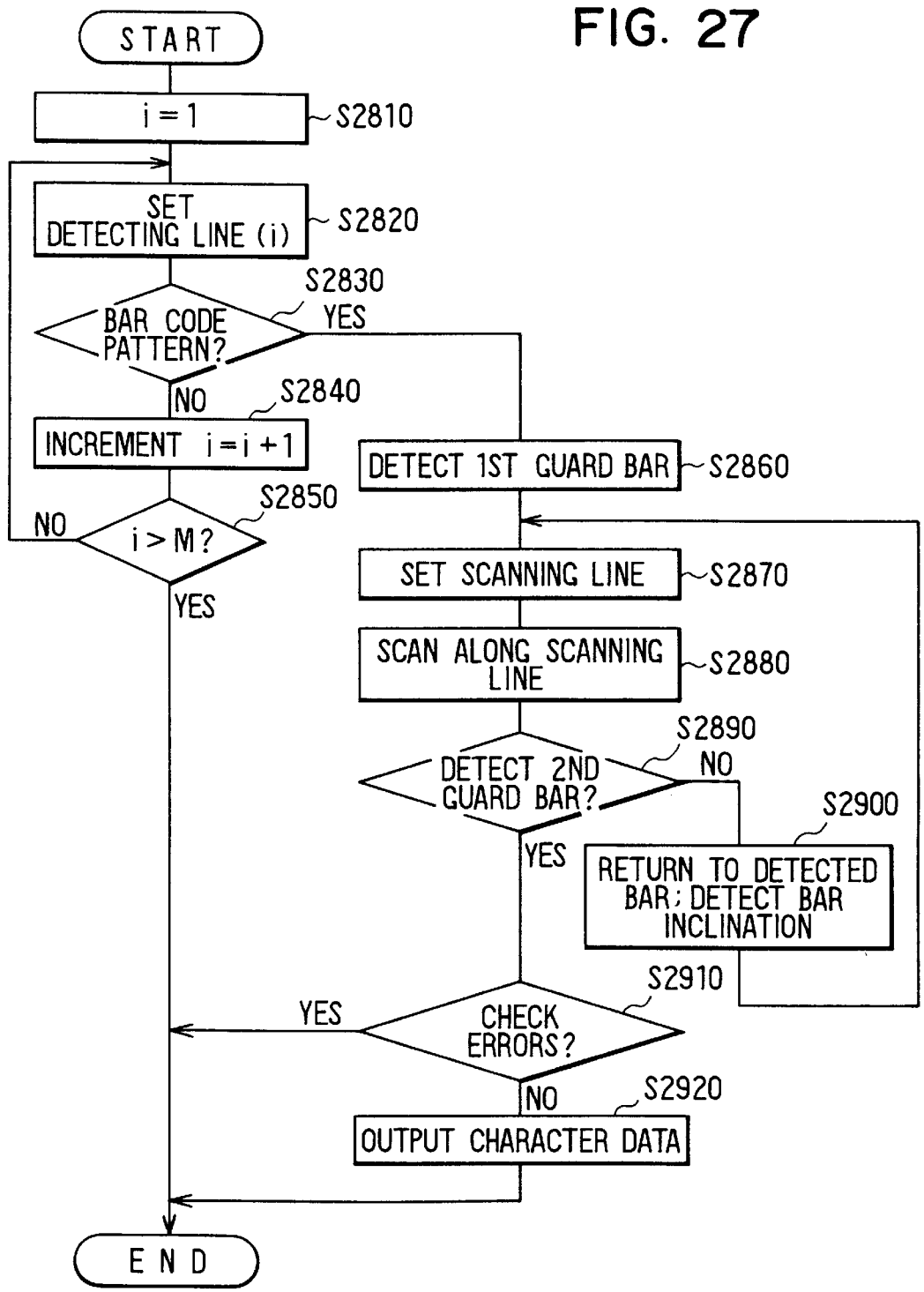
FIG. 27 is a flowchart showing a process of setting detecting lines, finding guard bars and reading bar code data.
Figure 28A:
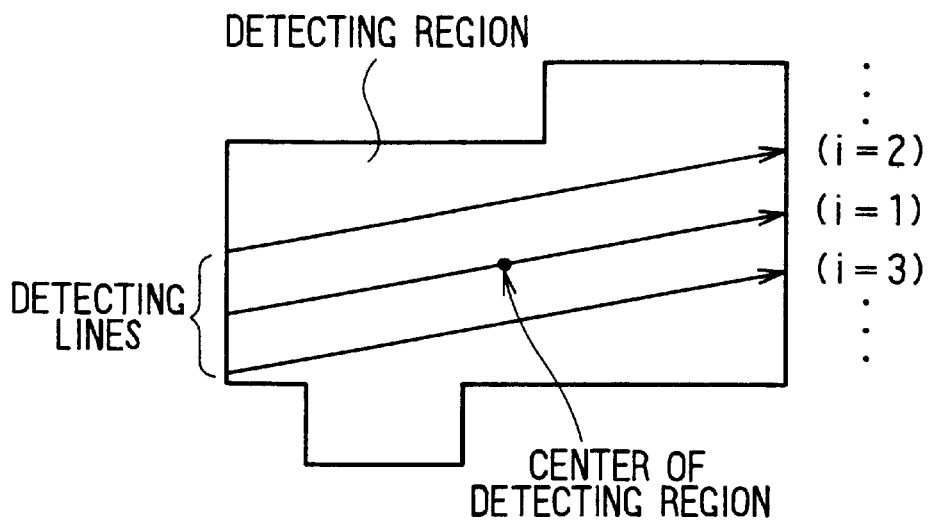
FIG. 28A is a schematic chart showing parallel detecting lines set in a detecting region.
Figure 28B:
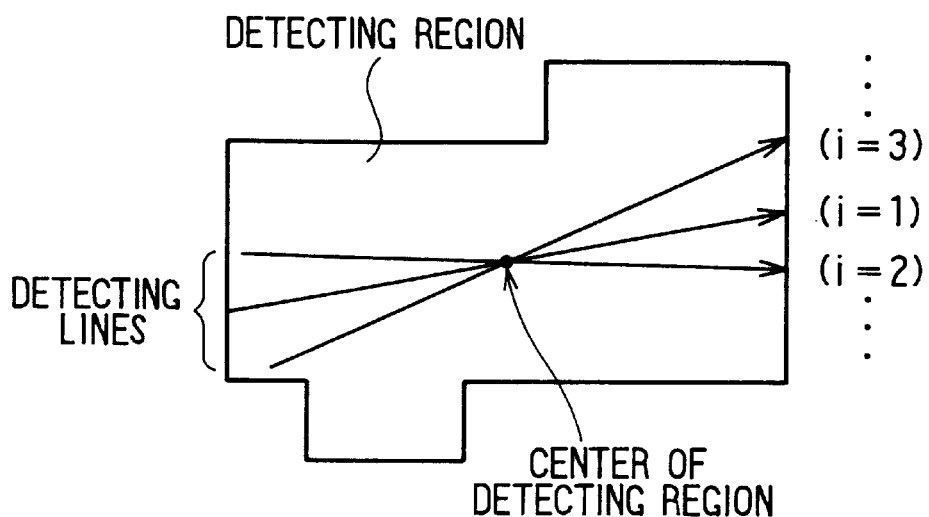
FIG. 28B is a schematic chart showing non-parallel detecting lines set in a detecting region.
Figure 29:
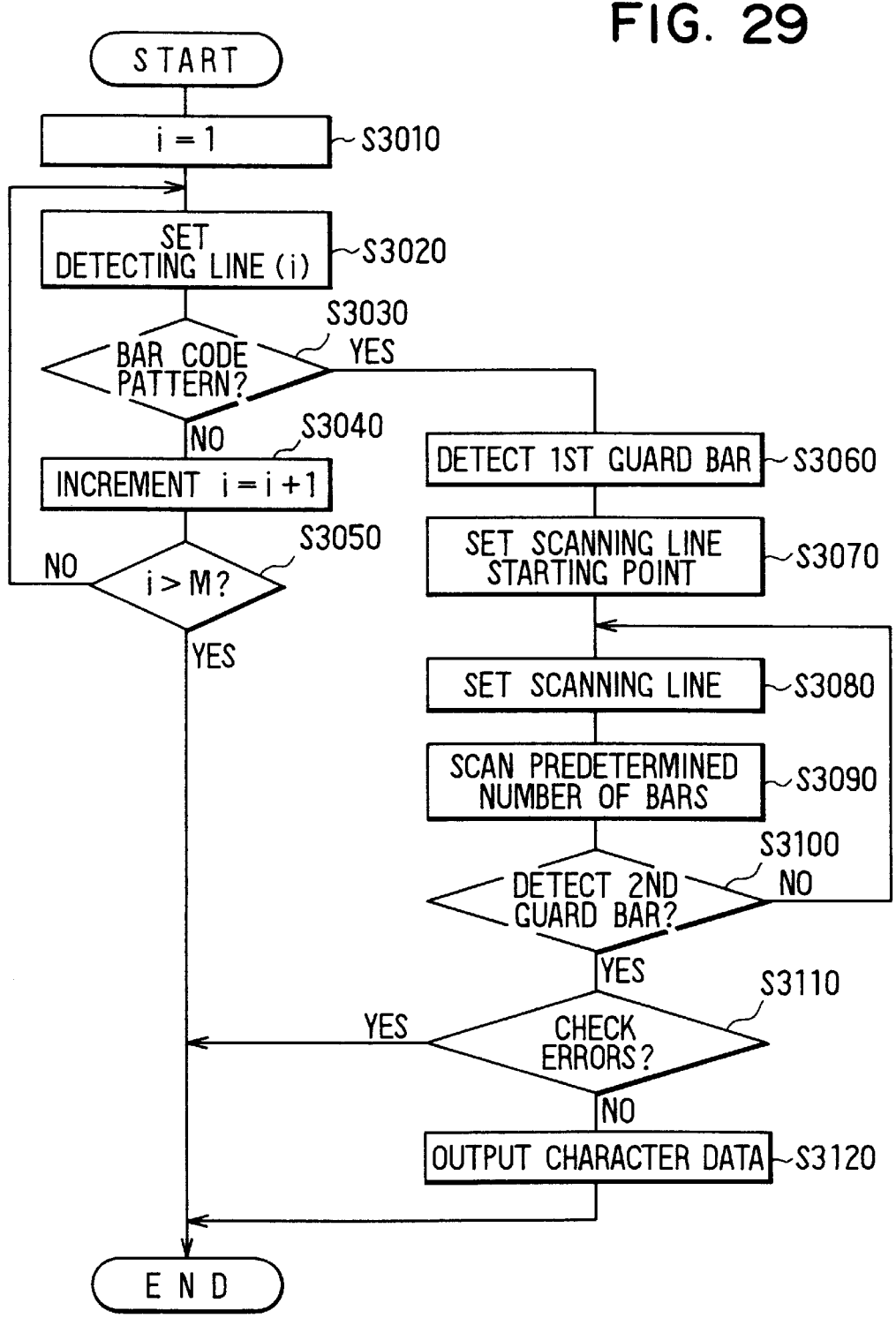
FIG. 29 is a flowchart showing another process of setting detecting lines, finding guard bars and reading bar code data.

The process of reading the bar code shown in FIG. 27 may be modified as shown in FIG. 29. In FIG. 29, steps S3070, S3080, S3090 and S3100 are modified, steps S3010–S3060 are the same as steps S2810–S2860 in FIG. 27, and steps S3110–S3120 are the same as steps S2910–S2920 in FIG. 27. Therefore, only the modified steps will be explained here. At step S3070, after the first guard bar Gb1 is detected at step S3060, a starting point of a first scanning line for reading the bar code is set at the center of the first guard bar Gb1. At step S3080, the first scanning line is set in the direction perpendicular to the first guard bar Gb1 (the inclination of the first guard bar is the same as the previously detected bar inclination θ). At step S3090, a predetermined number of bars in the bar code, or a predetermined distance, is scanned along the first scanning line. At step S3100, whether the second guard bar Gb2 is found or not is determined. If the second guard bar Gb2 is not found, the process returns to step S3080 where a second scanning line is set perpendicularly to the last bar scanned by the first scanning line. This loop is repeated until the second guard bar Gb2 is found by the last set scanning line. In short, in this modification, the first scanning line only scans a predetermined number of bars or a predetermined distance, instead of scanning until it goes out of the detecting region, and then the next scanning line is set so that it starts from the last scanned bar. This is repeated until the last set scanning line finds the second guard bar Gb2.

The order of setting detecting lines shown in FIGS. 28A and 28B may be changed. That is, those detecting lines may be set sequentially from the upper part of the detecting region toward the bottom part, or vice versa. However, efficiency of finding the first guard bar Gb1 might be a little sacrificed, because the bar code is most probably located near the center of the detecting region.

Though the Nc(a)/Nc(m) ratio is used in selecting the detecting sections from the candidate sections in the fourth embodiment, a total count of Nc(a) and Nc(m) may be used for this purpose. This is because it is presumed that the total number also becomes similar in the sections where the bar code is included. However, if some other figures such as characters are included in the bar code region, the total count of Nc might be affected by those figures, while it is highly probable that the ratio Nc(a) to Nc(m) correctly indicates existence of the bar code.

The bar inclination θ is calculated according to the formula, tan θ=Nc(a)/Nc(m), and the detecting sections are selected based on the ratio Nc(m)/Nc(a) in the fourth embodiment. As a basis of the calculation and selection, it is presumed that both Nc(a) and Nc(m) represent a certain number of counts. However, if the number of counts is too small, the calculation or selection cannot be possible. For example, if the size of a detecting section is too small as shown in FIG. 30A, and a bar and a space in a given bar code are so wide to cover one section entirely, then the number of brightness changes (Nc(a) and/or Nc(m)) in one section becomes zero (0). In this case, the ratio Nc(a)/Nc(m) cannot be calculated. On the other hand, if a section is too large compared with the size of a bar code as shown in FIG. 30C, the bar code region in the image region cannot be properly identified. Therefore, the section size has to be properly selected according to the bar code size. For this purpose, a small section size as in FIG. 30A and a large section size as in FIG. 30C may be pre-installed in the program in addition to a normal section size as in FIG. 30B. A proper section size may be automatically selected from among the pre-installed sizes in accordance with a bar code size to be read, or manually selected by a bar code user.

The shape of a detection section is not limited to a square one, but it may be rectangular shape or other shapes, though the square shape is preferable in calculating the bar inclination from the ratio Nc(a)/Nc(m).

Though the number of brightness changes Nc is counted in both directions, i.e., from bright to dark, and from dark to bright, it may be counted only in one direction, i.e., from bright to dark, or vice versa.

The process of reading a bar code is programmed to be performed in a computer system or a digital device. The program is stored in a medium such as a floppy disc, a photomagnetic disc, a CD-ROM, a hard disc, or the like, and it may be down-loaded to a computer system. A ROM or a backup RAM of the program may be stored in a medium which is to be installed in a computer system.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A method of reading a bar code having a plurality of bars and spaces, the method comprising steps of:

setting detecting lines running in horizontal and vertical directions on two-dimensional image region including a bar code region having a pair of guard bars at both sides thereof, the two-dimensional image region being temporarily stored in an image memory;

detecting one of the guard bars in the bar code region by scanning the image region along the detecting lines;

setting a scanning line starting from the detected guard bar and extending perpendicularly thereto;

scanning the bar code region along the scanning line to read the bar code;

tracing back the scanning line to a bar last read by the scanning line, if the scanning line goes out of the bar code region without reaching the other guard bar;

setting a new scanning line starting from the last read bar and extending perpendicularly thereto to read the rest of the bar code; and repeating a new scanning line setting step until a newly set scanning line reaches the other guard bar and a whole bar code is scanned and read.

2. A method of reading a bar code having a plurality of bars and spaces, the method comprising steps of:

setting detecting lines running in horizontal and vertical directions on two-dimensional image region including a bar code region having a pair of guard bars at both sides thereof, the two-dimensional image region being temporarily stored in an image memory;

detecting one of the guard bars in the bar code region by scanning the image region along the detecting lines;

setting a scanning line starting from the detected guard bar and extending perpendicularly thereto;

scanning a predetermined number of bars or a predetermined distance along the scanning line to read the bar code;

setting a new scanning line starting from the last read bar and extending perpendicularly thereto to read the rest of the bar code; and repeating a new scanning line setting step until a newly set scanning line reaches the other guard bar and a whole bar code is scanned and read.

3. The method of reading a bar code as in claim 2, wherein:

the predetermined number of bars is one.

4. The method of reading a bar code as in claim 1 or 2, wherein:

the scanning line starts from a first cross-point of the detecting line and the detected guard bar; and the newly set scanning line starts from a new cross-point of the scanning line and the last read bar.

5. The method of reading a bar code as in claim 4, wherein:

the scanning line starts from a point which is shifted by a predetermined distance from the first cross-point toward the center of the detected guard bar, if the first cross-point is located close to either end of the detected guard bar; and the newly set scanning line starts from a point which is shifted by a predetermined distance from the new cross-point toward the center of the last read bar, if the new cross-point is located close to either end of the last read bar.

6. The method of reading a bar code as in claim 1 or 2, wherein:

the scanning line starts from the center of the detecting line; and the newly set scanning line starts from the center of the last read bar.

7. The method of reading a bar code as in claim 1 or 2, wherein:

the horizontal and vertical detecting lines include a plurality of detecting lines, respectively.

8. The method of reading a bar code as in claim 7, wherein:

both the horizontal and the vertical detecting lines are more densely set around the center of the two-dimensional image region than in portions remote from the center.

9. The method of reading a bar code as in claim 7, wherein:

the two-dimensional image region is sequentially scanned by detecting lines from the center of the image region toward the sides of the image region.

10. The method of reading a bar code as in claim 7, wherein:

the two-dimensional image region is first scanned by either one set of the horizontal detecting lines or the vertical detecting lines, and then is scanned by the other set thereof if no guard bar is detected when all the detecting lines of the one set are used up.

11. A method of reading a bar code having a plurality of bars and spaces, the method comprising steps of:

dividing a two-dimensional image region including a bar code region having a pair of guard bars at both sides thereof into a plurality of rectangular sections, the image region being temporarily stored in an image memory;

preliminarily scanning the divided sections;

counting a number of brightness changes in each divided section;

selecting detecting sections which most probably constitute the bar code region from among the divided sections, based on the counted number of brightness changes;

setting a first detecting line running in the detecting sections;

detecting one of the guard bars in the bar code region by scanning the detecting sections along the first detecting line;

setting a scanning line starting from the detected guard bar and extending in the direction of the first detecting line;

scanning the bar code region along the scanning line to read the bar code;

tracing back the scanning line to a bar last read by the scanning line, if the scanning line goes out of the bar code region without reaching the other guard bar;

setting a new scanning line starting from the last read bar and extending perpendicularly thereto to read the rest of the bar code; and repeating a new scanning line setting step until a newly set scanning line reaches the other guard bar and a whole bar code is scanned and read.

12. A method of reading a bar code having a plurality of bars and spaces, the method comprising steps of:

dividing a two-dimensional image region including a bar code region having a pair of guard bars at both sides thereof into a plurality of rectangular sections, the image region being temporarily stored in an image memory;

preliminarily scanning the divided sections;

counting a number of brightness changes in each divided section;

selecting detecting sections which most probably constitute the bar code region from among the divided sections, based on the counted number of brightness changes;

setting a first detecting line running in the detecting sections;

detecting one of the guard bars in the bar code region by scanning the detecting sections along the first detecting line;

setting a scanning line starting from the detected guard bar and extending in a direction of the first detecting line;

scanning a predetermined number of bars or a predetermined distance along the scanning line to read the bar code;

setting a new scanning line starting from the last read bar and extending perpendicularly thereto to read the rest of the bar code; and repeating a new scanning line setting step until a newly set scanning line reaches the other guard bar and a whole bar code is scanned and read.

13. The method of reading a bar code as in claim 11 or 12, wherein:

the two-dimensional image region is divided into a plurality of rectangular sections by a plurality of horizontal and vertical lines running in the image region; and the divided sections are preliminarily scanned by a plurality of main scanning lines running in the horizontal direction and a plurality of auxiliary scanning lines running in the vertical direction.

14. The method of reading a bar code as in claim 13, wherein:

a plurality of patterns for dividing the image region into rectangular sections are provided, each pattern including divided sections each having a size different from that of other patterns, and one pattern is selected according to the bar code to be read.

15. The method of reading a bar code as in claim 11 or 12, wherein:

the first detecting line setting step includes steps of identifying a group of detecting sections each having a most common brightness change characteristic; calculating an inclination of the bar located in a detecting section belonging to the identified group; and setting the first detecting line in a direction perpendicular to the calculated bar inclination.

16. The method of reading a bar code as in claim 15, wherein:

the first detecting line is set so that it substantially passes a center of a detecting region constituted by the detecting sections.

17. The method of reading a bar code as in claim 16, wherein:

at least one second detecting line is set so that it extends in parallel to the first detecting line, if the bar code has not been fully read by scanning along the first detecting line, and the bar code region is further scanned along the second detecting line.

18. The method of reading a bar code as in claim 16, wherein:

at least one second detecting line that is not parallel to the first detecting line is set, if the bar code has not been fully read by scanning along the first detecting line, and the bar code region is further scanned along the second detecting line.

19. The method of reading a bar code as in claim 18, wherein:

the second detecting line is set so that it crosses the first detecting line at a vicinity of the center of the detecting region.

20. The method of reading a bar code as in claim 15, wherein:

the brightness change characteristic of each detecting section is determined based on the number of brightness changes.

21. The method of reading a bar code as in claim 15, wherein:

the brightness change characteristic of each detecting section is determined based on a ratio of the number of brightness changes counted by preliminarily scanning the detecting sections in the vertical direction to the number of brightness changes counted by preliminarily scanning the detecting sections in the horizontal direction.

* * * * *